United States Patent
Harding et al.

(10) Patent No.: US 10,502,421 B2
(45) Date of Patent: Dec. 10, 2019

(54) COMBUSTION CHAMBER AND A COMBUSTION CHAMBER SEGMENT

(71) Applicant: ROLLS-ROYCE plc, London (GB)

(72) Inventors: Stephen Charles Harding, Bristol (GB); Paul Allan Hucker, Bristol (GB); Giuseppe Rallo, Bristol (GB)

(73) Assignee: ROLLS-ROYCE plc, London (GB)

( * ) Notice: Subject to any disclaimer, the term of this patent is extended or adjusted under 35 U.S.C. 154(b) by 757 days.

(21) Appl. No.: 15/010,800

(22) Filed: Jan. 29, 2016

(65) Prior Publication Data

US 2016/0258624 A1 Sep. 8, 2016

(30) Foreign Application Priority Data

Feb. 4, 2015 (GB) .................................. 1501817.9

(51) Int. Cl.
*F23R 3/00* (2006.01)
*F23R 3/60* (2006.01)
(Continued)

(52) U.S. Cl.
CPC ................ *F23R 3/002* (2013.01); *F02C 7/20* (2013.01); *F23M 5/04* (2013.01); *F23R 3/60* (2013.01);
(Continued)

(58) Field of Classification Search
CPC .... F02C 7/20; F23R 3/002; F23R 3/60; F23R 3/50; F23R 3/44;
(Continued)

(56) References Cited

U.S. PATENT DOCUMENTS 2,369,965 A * 2/1945 Harris ..................... F23M 5/00
126/151
2,651,912 A * 9/1953 Abbott .................... F23C 99/00
60/755
(Continued)

FOREIGN PATENT DOCUMENTS

EP 1635118 A2 3/2006
EP 1939529 A1 * 7/2008 .............. F23R 3/002
(Continued)

OTHER PUBLICATIONS

May 25, 2016 Search Report issued in European Patent Application No. 16153083.
(Continued)

*Primary Examiner* — Gerald L Sung
*Assistant Examiner* — Alain Chau
(74) *Attorney, Agent, or Firm* — Oliff PLC

(57) ABSTRACT

A combustion chamber comprises an upstream ring structure, a downstream ring structure and a plurality of circumferentially arranged combustion chamber segments. Each combustion chamber segment extends the full length of the combustion chamber. Each combustion chamber segment comprises a frame structure and at least an inner wall and the frame structure and the inner wall are integral. An upstream end of each combustion chamber segment is secured to the upstream ring structure and a downstream end of each combustion chamber segment is mounted on the downstream ring structure. The combustion chamber segments are manufactured by additive layer manufacture. The combustion chamber segments have a stiff frame structure which carries the structural loads, the thermal loads, surge loads and flameout loads and the frame structure distributes loads into adjacent components.

34 Claims, 10 Drawing Sheets

(51) Int. Cl.
*F23M 5/04* (2006.01)
*F02C 7/20* (2006.01)

(52) U.S. Cl.
CPC .............. *F23M 2900/05005* (2013.01); *F23R 2900/00012* (2013.01); *F23R 2900/00017* (2013.01); *F23R 2900/03041* (2013.01); *F23R 2900/03043* (2013.01)

(58) Field of Classification Search
CPC ...................... F23R 2900/03041–03044; F23R 2900/00017; F23R 2900/00012; F23M 5/04; F23M 5/00; F23M 5/04; F23M 2900/05005
See application file for complete search history.

(56) References Cited

U.S. PATENT DOCUMENTS

| | | | | |
|---|---|---|---|---|
| 2,918,793 | A * | 12/1959 | Jerie | F23R 3/002 60/755 |
| 2,919,549 | A * | 1/1960 | Haworth | F02K 1/822 415/217.1 |
| 4,158,949 | A * | 6/1979 | Reider | F23R 3/50 60/737 |
| 4,480,436 | A * | 11/1984 | Maclin | F23R 3/002 60/752 |
| 6,434,821 | B1 | 8/2002 | Nelson et al. | |
| 6,901,757 | B2 * | 6/2005 | Gerendas | F23M 5/00 110/336 |
| 6,931,855 | B2 * | 8/2005 | Glessner | F23M 5/04 29/890.01 |
| 7,861,531 | B2 * | 1/2011 | Bunel | F23R 3/10 60/752 |
| 7,886,540 | B2 * | 2/2011 | Webb | F02K 9/64 60/752 |
| 8,683,806 | B2 * | 4/2014 | Commaret | F23R 3/002 60/752 |
| 9,423,129 | B2 * | 8/2016 | Graves | F23R 3/002 |
| 2005/0097894 | A1 * | 5/2005 | Tiemann | F23M 5/04 60/772 |
| 2006/0179770 | A1 * | 8/2006 | Hodder | F23M 5/02 52/588.1 |
| 2008/0236164 | A1 * | 10/2008 | Bunel | F23R 3/10 60/740 |
| 2009/0019856 | A1 * | 1/2009 | Commaret | F23R 3/002 60/752 |
| 2010/0037621 | A1 * | 2/2010 | Tschuor | F23R 3/002 60/752 |
| 2010/0095680 | A1 * | 4/2010 | Rudrapatna | F23R 3/002 60/754 |
| 2012/0167574 | A1 * | 7/2012 | Uskert | F23M 5/02 60/754 |
| 2012/0237786 | A1 * | 9/2012 | Morrison | B22D 19/00 428/596 |
| 2013/0025287 | A1 * | 1/2013 | Cunha | F23R 3/002 60/772 |
| 2013/0209236 | A1 * | 8/2013 | Xu | F01D 5/186 415/116 |
| 2014/0216042 | A1 * | 8/2014 | Hanson | F23R 3/06 60/754 |
| 2014/0238031 | A1 * | 8/2014 | Okita | F23R 3/06 60/754 |
| 2015/0176843 | A1 * | 6/2015 | Garry | F23M 5/04 60/753 |
| 2015/0369490 | A1 * | 12/2015 | Cunha | F23R 3/002 29/428 |

FOREIGN PATENT DOCUMENTS

| | | |
|---|---|---|
| EP | 2554903 A2 | 2/2013 |
| GB | 1545783 A | 5/1979 |
| GB | 1561087 A | 2/1980 |
| GB | 2033071 A | 5/1980 |
| GB | 2 074 308 A | 10/1981 |
| GB | 2077635 A | 12/1981 |
| GB | 2179276 A | 3/1987 |
| GB | 2432902 A | 6/2007 |
| GB | 2491580 A | 12/2012 |

OTHER PUBLICATIONS

Jun. 18, 2015 Search Report issued in British Patent Application No. 1501817.9.

* cited by examiner

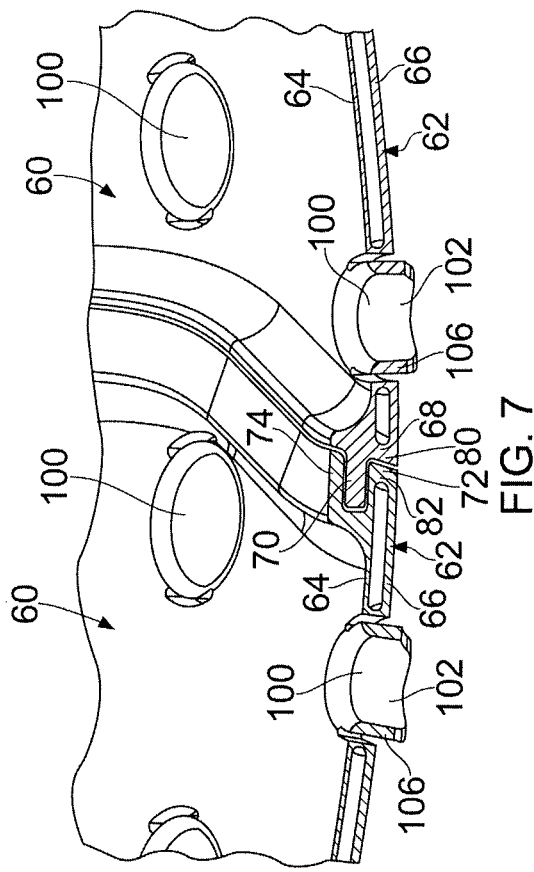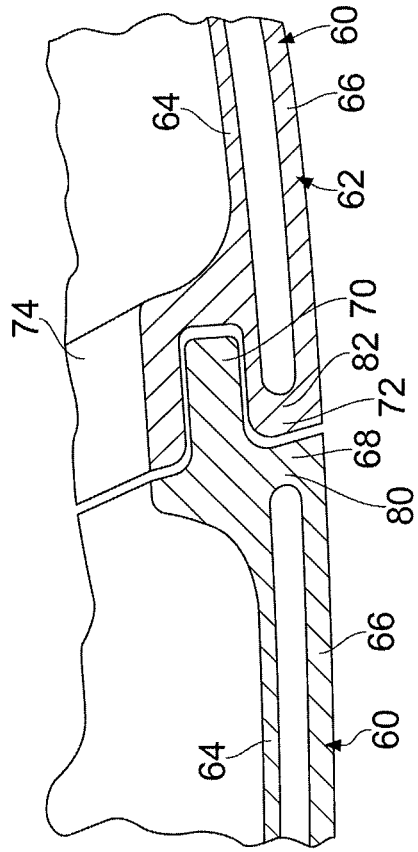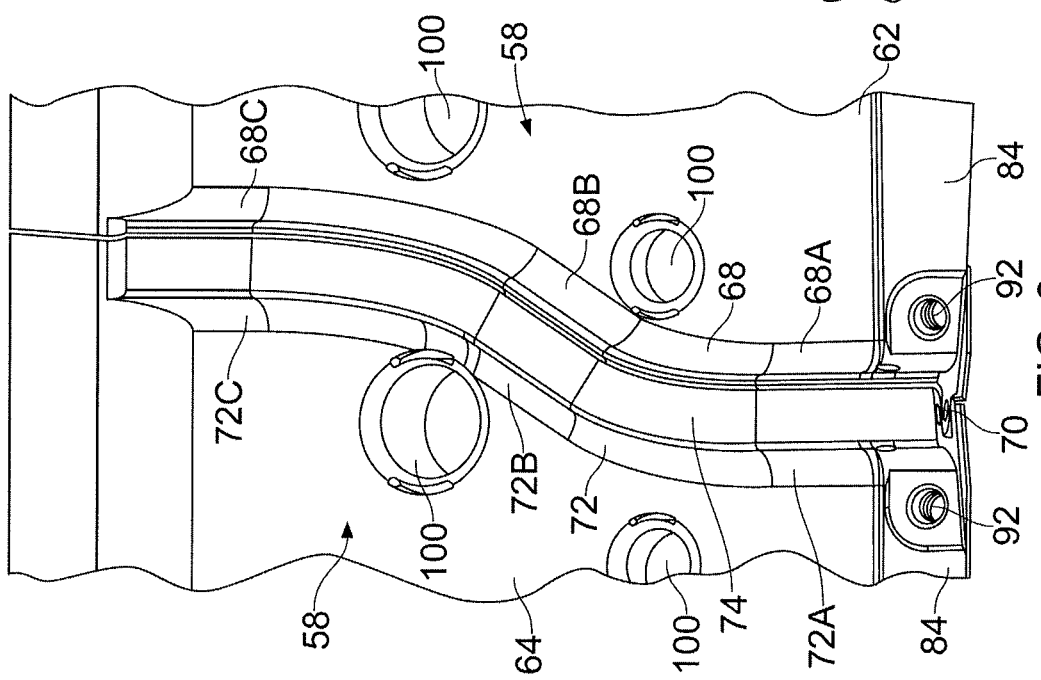

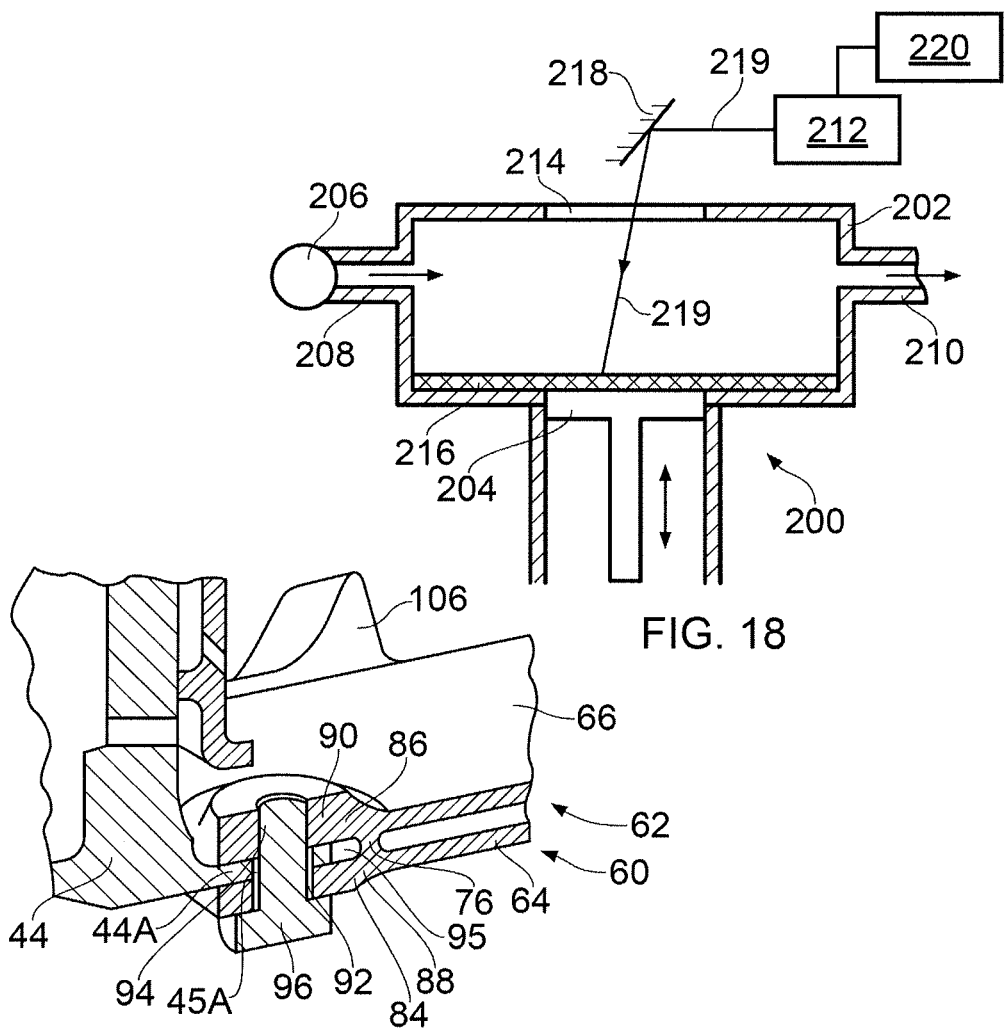
FIG. 18
FIG. 9
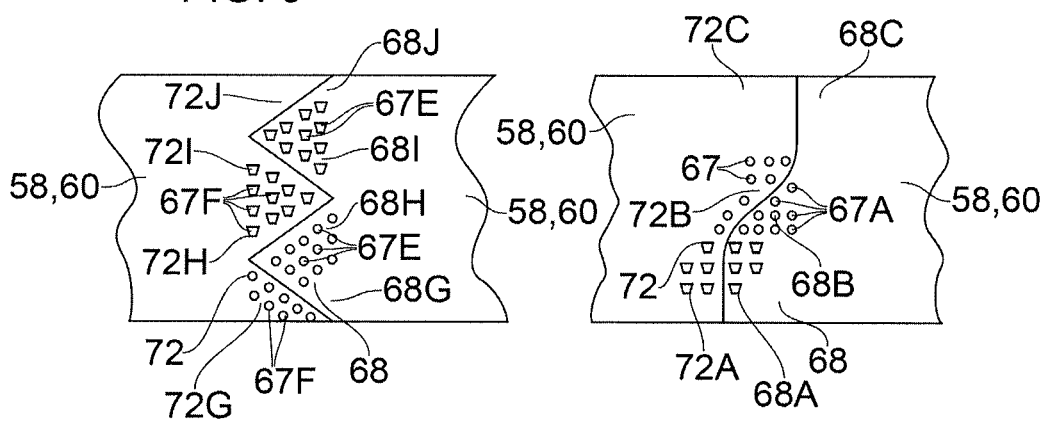
FIG. 16
FIG. 13

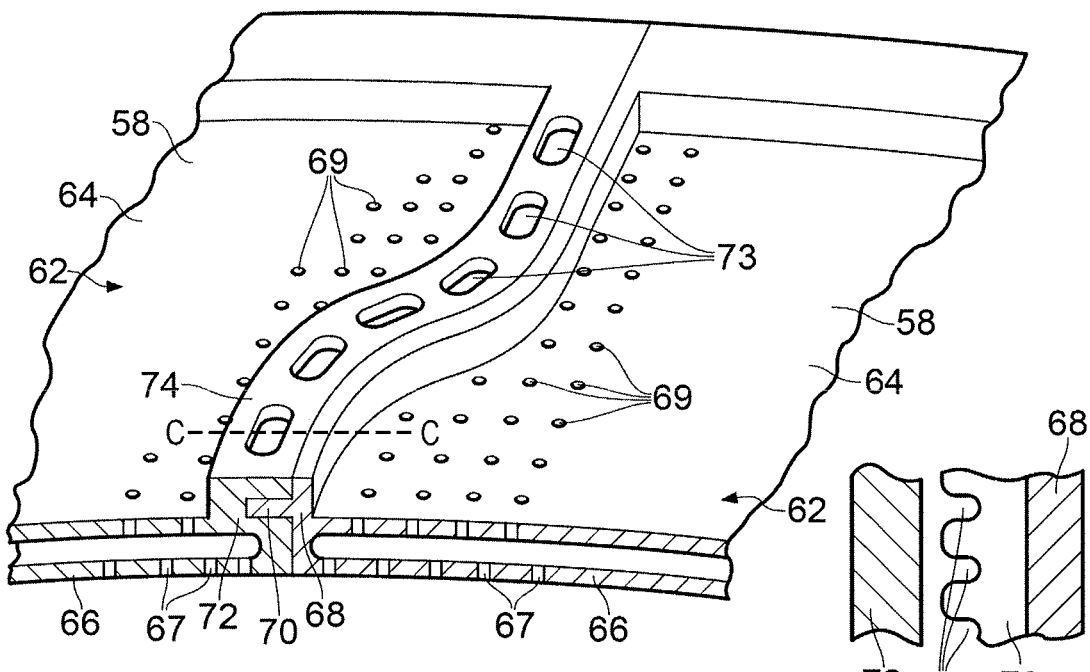
FIG. 12
FIG. 12C
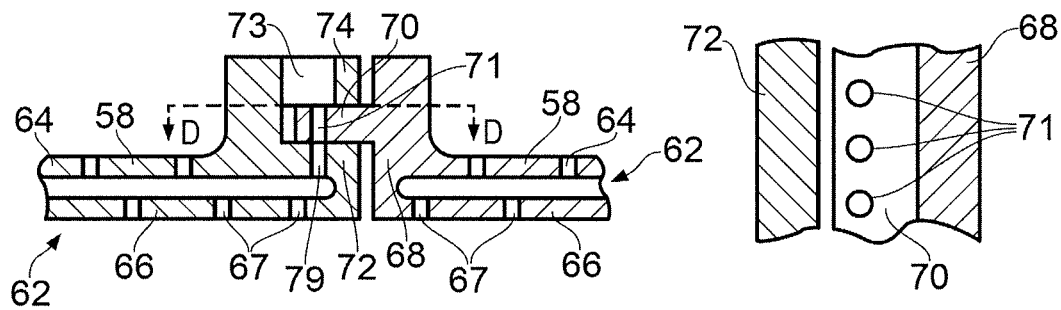
FIG. 12A
FIG. 12B
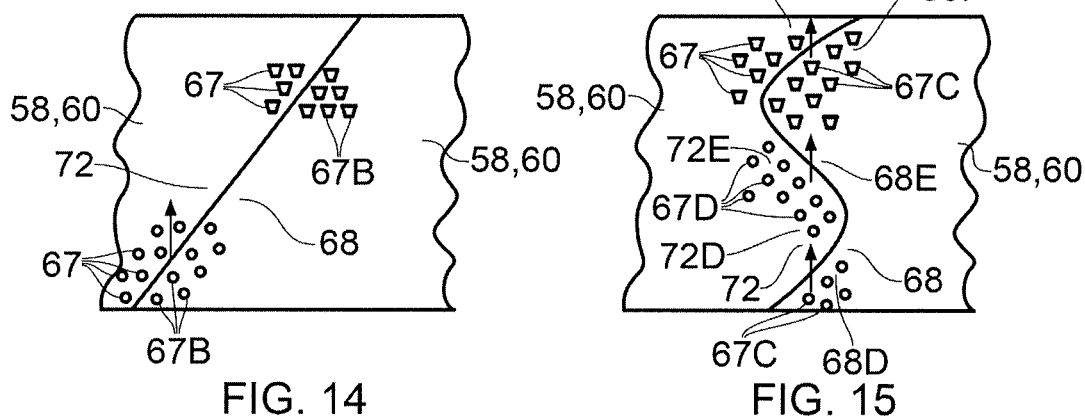
FIG. 14
FIG. 15

COMBUSTION CHAMBER AND A COMBUSTION CHAMBER SEGMENT

FIELD OF THE INVENTION

The present disclosure relates to a combustion chamber and a combustion chamber segment and in particular to a gas turbine engine combustion chamber and a gas turbine engine combustion chamber segment.

BACKGROUND TO THE INVENTION

Currently each gas turbine engine combustion chamber wall comprises an outer wall and an inner wall. The outer wall either comprises a fabricated sheet metal wall or a forged and machined wall. The inner wall comprises a plurality of cast metal tiles which are secured onto the outer wall using threaded studs, washers and nuts. The cast metal tiles either comprise a plurality of pedestals, projections or ribs on their outer, cooler, surface to provide convection cooling of the tiles or the cast metal tiles are provided with a plurality of apertures which extend from their outer, cooler, surface to their inner, hotter, surface to provide effusion cooling of the tiles. In both arrangements coolant is supplied through apertures in the outer wall to the space between the outer wall and inner wall.

The current gas turbine engine combustion chamber wall is expensive to manufacture due to the large number of manufacturing operations, for example forging and machining the outer wall, drilling apertures through the outer wall, casting the tiles, drilling apertures through the tiles etc. In addition the cooling effectiveness provided by the current gas turbine engine combustion chamber wall is limited by the designs which are possible using those particular manufacturing routes.

Therefore the present disclosure seeks to provide a novel combustion chamber and a novel combustion chamber segment which reduces or overcomes the above mentioned problem.

SUMMARY OF INVENTION

Accordingly the present disclosure provides a combustion chamber comprising an upstream ring structure, a downstream ring structure and a plurality of circumferentially arranged combustion chamber segments, each combustion chamber segment extending the full length of the combustion chamber, each combustion chamber segment comprising a frame structure and an inner wall, the frame structure and the inner wall being integral, an upstream end of each combustion chamber segment being secured to the upstream ring structure and a downstream end of each combustion chamber segment being mounted on the downstream ring structure.

Each combustion chamber segment may comprise a box like structure, the box like structure comprising the frame structure, the inner wall and an outer wall, the inner wall being spaced from the outer wall, the outer wall having a plurality of apertures for the supply of coolant into the box like structure and the frame structure, the inner wall and the outer wall being integral.

The box like structure of each combustion chamber segment may have a first end wall extending from a first end of the outer wall to a first end of the inner wall, a second end wall extending from a second, opposite, end of the outer wall to a second, opposite, end of the inner wall, a first edge wall extending from a first edge of the outer wall to a first edge of the inner wall, a second edge wall extending from a second, opposite, edge of the outer wall to a second, opposite, edge of the inner wall to form the box like structure.

The inner wall may have a plurality of apertures for the supply of coolant out of the box like structure into the combustion chamber.

The apertures in the inner wall may be arranged perpendicularly to the surface of the inner wall or at non-perpendicular angle to the surface of the inner wall.

The apertures in the inner wall arranged at a non-perpendicular angle to the surface of the inner wall may be angled in an axial direction.

The apertures in the inner wall may be U shaped apertures, each U shaped aperture having an inlet and an outlet downstream of a U shaped bend.

The apertures in the inner wall may have fan shaped outlets.

The apertures in the outer wall may be arranged perpendicularly to the surface of the outer wall.

The inner wall may have a plurality of pedestals extending towards the outer wall to provide additional cooling of the inner wall.

A cellular structure may be arranged between the inner wall and the outer wall, the cellular structure comprising a plurality of polyhedron shaped chambers defined by a matrix of integral interconnected walls, the polyhedron shaped chambers are arranged in at least two layers between the inner wall and the outer wall, at least some of the polyhedron shaped chambers in each layer are fluidly interconnected to at least some of the polyhedron shaped chambers in each adjacent layer by apertures extending through the integral interconnected walls of the polyhedron shaped chambers for the flow of coolant there-between, the apertures in the outer wall allowing a flow of coolant into the cellular structure and the apertures in the inner wall allowing a flow of coolant out of the cellular structure.

The polyhedron shaped chambers may be parallelogram sided cuboid shaped chambers, square based pyramid shaped chambers, rhombic dodecahedron shaped chambers, elongated dodecahedron shaped chambers, truncated dodecahedron shaped chambers or two types of irregular polyhedron shaped chambers arranged in a Weaire-Phelan structure.

The thickness of the wall of the polyhedron shaped chamber may be in the range of 0.2 to 2 mm. The distance between the walls of the polyhedron shaped chambers may be in the range of 1 to 4 mm.

The apertures in the outer wall may be arranged perpendicularly to the surface of the outer wall and the apertures in the inner wall may be arranged perpendicularly to the surface of the inner wall or at non-perpendicular angle to the surface of the inner wall so that the apertures in the outer wall provide impingement cooling of the inner wall and the apertures in the inner wall provide effusion cooling of the inner wall. The apertures in the inner wall arranged at a non-perpendicular angle to the surface of the inner wall may be angled in a longitudinal direction.

The first and second edges of each combustion chamber segment may be axially profiled so that the at least some of the apertures in the inner wall direct coolant over at least a portion of one of the edges of the combustion chamber segments.

The first and second edges of each combustion chamber segment may have a first portion extending with a purely axial component, a second portion extending with axial and circumferential components and a third portion extending with a purely axial component.

The first and second edges of each combustion chamber segment may extend with axial and circumferential components.

The first and second edges of each combustion chamber segment may be profiled so that the at least some of the apertures in the inner wall adjacent the first edge are arranged to direct coolant over at least a portion of the second edge of an adjacent combustion chamber segment.

The first and second edges of each combustion chamber segment may have an S-shape or a W-shape.

The first and second edges of each combustion chamber segment may be profiled so that the at least some of the apertures in the inner wall adjacent the first edge are arranged to direct coolant over at least a portion of the second edge of an adjacent combustion chamber segment and at least some of the apertures in the inner wall adjacent the second edge are arranged to direct coolant over at least a portion of the first edge of an adjacent combustion chamber segment.

The first and second edge walls may be arranged at a non-perpendicular angle to the outer wall and/or the inner wall. Preferably the first and second edge walls are arranged at an angle in the range of 70° to 85°. More preferably the first and second edge walls are arranged at an angle of 75° to 85°. More preferably the first and second edge walls are arranged at an angle of 80°. The first and second edge walls may be arranged at perpendicular to the outer wall and/or the inner wall.

A first edge of the frame structure may have an integral first hook extending from the inner wall, the first hook extending at least a portion of the length of the frame structure, the first hook being arranged at a first radial distance from the inner wall, a second edge of the frame structure having an integral second hook extending from the inner wall, the second hook extending at least a portion of the length of the frame structure, the second hook being arranged at a second radial distance from the inner wall and the second radial distance is greater than the first radial distance, the first hook of each combustion chamber segment engaging the frame structure at the second edge of an adjacent combustion chamber segment and the second hook of each combustion chamber segment engaging the first hook of an adjacent combustion chamber segment to form a seal and to distribute loads between the adjacent combustion chamber segments.

The first hook may extend the full length of the frame structure and the second hook may extend the full length of the frame structure.

The first hook may form a tongue and the second hook may form a groove. The first hook may form a dovetail shaped tongue and the second hook may form a dovetail shaped groove.

The second hook may have at least one aperture extending there-through to the groove, the first hook having at least one aperture extending there-through or the remote end of the first hook having at least one scallop and at least one aperture extending from the groove through the outer wall.

The first edge of the frame structure may have a plurality of integral first hooks extending from the inner wall and the second edge of the frame structure having a plurality of integral second hooks extending from the inner wall.

The frame structure of each combustion chamber segment may have a first end wall extending from a first end of the inner wall, a second end wall extending from a second, opposite, end of the inner wall, a first edge wall extending from a first edge of the inner wall, a second edge wall extending from a second, opposite, edge of the inner wall and the first end wall, the first edge wall, the second end wall and the second edge wall being integral to form the frame structure.

The combustion chamber segments may be formed from a nickel base superalloy, a cobalt base superalloy or an iron base superalloy.

A thermal barrier coating may be provided on the inner wall of the combustion chamber segments.

The thermal barrier coating may comprise a ceramic material. The ceramic material may comprise zirconia or stabilised zirconia. A bond coating may be provided on the inner wall of the combustion chamber and the thermal barrier coating being provided on the bond coating. The bond coating may comprise an overlay coating, e.g. a MCrAlY coating where M is one or more of nickel, cobalt or iron, Cr is chromium, Al is aluminium and Y is one or more rare earth metals, e.g. yttrium, ytterbium, lanthanum etc.

The combustion chamber segments may be formed by additive layer manufacturing.

The upstream ring structure may be an upstream end wall of the combustion chamber and the downstream ring structure may be a discharge nozzle.

The upstream end of each combustion chamber segment may be fastened, welded or bonded to the upstream end wall of the combustion chamber and the downstream end of each combustion chamber segment may be fastened, welded or bonded to the discharge nozzle.

The first end of the outer wall may have a flange and the flange having at least one locally thicker region, each locally thicker region of the outer wall having an aperture extending there-through, the first end of the inner wall having a flange and the flange having at least one locally thicker region, each locally thicker region of the inner wall having an aperture extending there-through, the at least one locally thicker region at the first end of the outer wall being arranged such that the aperture is aligned with the aperture through the corresponding locally thicker region of the inner wall and a slot is formed between the first end wall, the flange of the first end of the inner wall and the flange of the first end of the outer wall.

The flange at the first end of the outer wall and the flange at the first end of the inner wall may have a plurality of locally thickened regions and the locally thicker regions being spaced apart laterally between the first and second edges of the outer and inner walls.

The flange at the first end of the outer wall may have at least one longitudinally extending slot positioned laterally between two laterally spaced locally thickened regions of the outer wall.

The aperture in the at least one locally thickened region of the inner wall may be threaded.

If the combustion chamber is a rich burn combustion chamber, the outer wall may have at least one dilution aperture, the inner wall having at least one dilution aperture aligned with the corresponding dilution aperture in the outer wall, at least one dilution wall extending from the periphery of the corresponding dilution aperture in the outer wall to the periphery of the corresponding dilution aperture in the inner wall.

The inner wall may have at least one dilution chute, the at least one dilution chute extending from the inner wall in a direction away from the inner wall and the outer wall and each dilution chute being aligned with a corresponding one of the dilution apertures in the inner wall.

The at least one dilution chute comprising a double wall structure defining a chamber, the at least one dilution wall forming the double wall structure, the at least one dilution wall having a first portion extending from the outer wall through the corresponding dilution aperture in the inner wall and away from the outer wall and inner wall and the at least one dilution wall having a second portion extending from the end of the first portion remote from the outer wall to the inner wall and the second portion of the at least one dilution wall having a plurality of apertures extending there-through.

The present disclosure also provides a combustion chamber segment, the combustion chamber segment extending the full length of the combustion chamber, the combustion chamber segment comprising a frame structure and an inner wall, the frame structure and the inner wall being integral, the upstream end of the combustion chamber segment having features to secure the combustion chamber segment to an upstream ring structure and a downstream end of the combustion chamber segment having features to mount the combustion chamber segment on a downstream ring structure.

The combustion chamber segment may comprise a box like structure, the box like structure comprising the frame structure, the inner wall and an outer wall, the inner wall being spaced from the outer wall, the outer wall having a plurality of apertures for the supply of coolant into the box like structure and the frame structure, the inner wall and the outer wall being integral.

The box like structure of the combustion chamber segment may have a first end wall extending from a first end of the outer wall to a first end of the inner wall, a second end wall extending from a second, opposite, end of the outer wall to a second, opposite, end of the inner wall, a first edge wall extending from a first edge of the outer wall to a first edge of the inner wall, a second edge wall extending from a second, opposite, edge of the outer wall to a second, opposite, edge of the inner wall to form the box like structure.

The inner wall may have a plurality of apertures for the supply of coolant out of the box like structure into the combustion chamber.

The apertures in the inner wall may be arranged perpendicularly to the surface of the inner wall or at non-perpendicular angle to the surface of the inner wall.

The apertures in the inner wall arranged at a non-perpendicular angle to the surface of the inner wall may be angled in an axial direction.

The apertures in the inner wall may be U shaped apertures, each U shaped aperture having an inlet and an outlet downstream of a U shaped bend.

The apertures in the inner wall may have fan shaped outlets.

The apertures in the outer wall may be arranged perpendicularly to the surface of the outer wall.

The inner wall may have a plurality of pedestals extending towards the outer wall to provide additional cooling of the inner wall.

A cellular structure may be arranged between the inner wall and the outer wall, the cellular structure comprising a plurality of polyhedron shaped chambers defined by a matrix of integral interconnected walls, the polyhedron shaped chambers are arranged in at least two layers between the inner wall and the outer wall, at least some of the polyhedron shaped chambers in each layer are fluidly interconnected to at least some of the polyhedron shaped chambers in each adjacent layer by apertures extending through the integral interconnected walls of the polyhedron shaped chambers for the flow of coolant there-between, the apertures in the outer wall allowing a flow of coolant into the cellular structure and the apertures in the inner wall allowing a flow of coolant out of the cellular structure.

The polyhedron shaped chambers may be parallelogram sided cuboid shaped chambers, square based pyramid shaped chambers, rhombic dodecahedron shaped chambers, elongated dodecahedron shaped chambers, truncated dodecahedron shaped chambers or two types of irregular polyhedron shaped chambers arranged in a Weaire-Phelan structure.

The thickness of the wall of the polyhedron shaped chamber may be in the range of 0.2 to 2 mm. The distance between the walls of the polyhedron shaped chambers may be in the range of 1 to 4 mm.

The apertures in the outer wall may be arranged perpendicularly to the surface of the outer wall and the apertures in the inner wall may be arranged perpendicularly to the surface of the inner wall or at non-perpendicular angle to the surface of the inner wall so that the apertures in the outer wall provide impingement cooling of the inner wall and the apertures in the inner wall provide effusion cooling of the inner wall. The apertures in the inner wall arranged at a non-perpendicular angle to the surface of the inner wall may be angled in a longitudinal direction.

The first and second edges of the combustion chamber segment may be axially profiled so that the at least some of the apertures in the inner wall direct coolant over at least a portion of one of the edges of the combustion chamber segment.

The first and second edges of the combustion chamber segment may have a first portion extending with a purely axial component, a second portion extending with axial and circumferential components and a third portion extending with a purely axial component.

The first and second edges of the combustion chamber segment may extend with axial and circumferential components.

The first and second edges of the combustion chamber segment may be profiled so that the at least some of the apertures in the inner wall adjacent the first edge are arranged to direct coolant over at least a portion of the second edge of an adjacent combustion chamber segment.

The first and second edges of the combustion chamber segment may have an S-shape or a W-shape.

The first and second edges of the combustion chamber segment may be profiled so that the at least some of the apertures in the inner wall adjacent the first edge are arranged to direct coolant over at least a portion of the second edge of an adjacent combustion chamber segment and at least some of the apertures in the inner wall adjacent the second edge are arranged to direct coolant over at least a portion of the first edge of an adjacent combustion chamber segment.

The first and second edge walls may be arranged at a non-perpendicular angle to the outer wall. Preferably the first and second edge walls are arranged at an angle in the range of 70° to 85°. More preferably the first and second edge walls are arranged at an angle of 75° to 85°. More preferably the first and second edge walls are arranged at an angle of 80°.

A first edge of the frame structure may have an integral first hook extending from the inner wall, the first hook extending at least a portion of the length of the frame structure, the first hook being arranged at a first radial distance from the inner wall, a second edge of the frame structure having an integral second hook extending from the inner wall, the second hook extending at least a portion of the length of the frame structure, the second hook being arranged at a second radial distance from the inner wall and the second radial distance is greater than the first radial distance.

The first hook may extend the full length of the frame structure and the second hook may extend the full length of the frame structure.

The first hook may form a tongue and the second hook may form a groove. The first hook may form a dovetail shaped tongue and the second hook may form a dovetail shaped groove.

The second hook may have at least one aperture extending there-through to the groove, the first hook having at least one aperture extending there-through or the remote end of the first hook having at least one scallop and at least one aperture extending from the groove through the outer wall.

The first edge of the frame structure may have a plurality of integral first hooks extending from the inner wall and the second edge of the frame structure having a plurality of integral second hooks extending from the inner wall.

The frame structure of the combustion chamber segment may have a first end wall extending from a first end of the inner wall, a second end wall extending from a second, opposite, end of the inner wall, a first edge wall extending from a first edge of the inner wall, a second edge wall extending from a second, opposite, edge of the inner wall and the first end wall, the first edge wall, the second end wall and the second edge wall being integral to form the frame structure.

The combustion chamber segment may be formed from a nickel base superalloy, a cobalt base superalloy or an iron base superalloy.

A thermal barrier coating may be provided on the inner wall of the combustion chamber segment.

The thermal barrier coating may comprise a ceramic material. The ceramic material may comprise zirconia or stabilised zirconia. A bond coating may be provided on the inner wall of the combustion chamber and the thermal barrier coating being provided on the bond coating. The bond coating may comprise an overlay coating, e.g. a MCrAlY coating where M is one or more of nickel, cobalt or iron, Cr is chromium, Al is aluminium and Y is one or more rare earth metals, e.g. yttrium, ytterbium, lanthanum etc.

The combustion chamber segment may be formed by additive layer manufacturing.

The first end of the outer wall may have a flange and the flange having at least one locally thicker region, each locally thicker region of the outer wall having an aperture extending there-through, the first end of the inner wall having a flange and the flange having at least one locally thicker region, each locally thicker region of the inner wall having an aperture extending there-through, the at least one locally thicker region at the first end of the outer wall being arranged such that the aperture is aligned with the aperture through the corresponding locally thicker region of the inner wall and a slot is formed between the first end wall, the flange of the first end of the inner wall and the flange of the first end of the outer wall.

The flange at the first end of the outer wall and the flange at the first end of the inner wall may have a plurality of locally thickened regions and the locally thicker regions being spaced apart laterally between the first and second edges of the outer and inner walls.

The flange at the first end of the outer wall may have at least one longitudinally extending slot positioned laterally between two laterally spaced locally thickened regions of the outer wall.

The aperture in the at least one locally thickened region of the inner wall may be threaded.

If the combustion chamber is a rich burn combustion chamber, the outer wall may have at least one dilution aperture, the inner wall having at least one dilution aperture aligned with the corresponding dilution aperture in the outer wall, at least one dilution wall extending from the periphery of the corresponding dilution aperture in the outer wall to the periphery of the corresponding dilution aperture in the inner wall.

The inner wall may have at least one dilution chute, the at least one dilution chute extending from the inner wall in a direction away from the inner wall and the outer wall and each dilution chute being aligned with a corresponding one of the dilution apertures in the inner wall.

The at least one dilution chute comprising a double wall structure defining a chamber, the at least one dilution wall forming the double wall structure, the at least one dilution wall having a first portion extending from the outer wall through the corresponding dilution aperture in the inner wall and away from the outer wall and inner wall and the at least one dilution wall having a second portion extending from the end of the first portion remote from the outer wall to the inner wall and the second portion of the at least one dilution wall having a plurality of apertures extending there-through.

The combustion chamber segment may comprise a box like structure including an outer wall and an inner wall spaced from the outer wall, the outer wall having a plurality of apertures for the supply of coolant into the box like structure, the inner wall having a plurality of apertures for the supply of coolant out of the box like structure, a first edge of the box like structure having a first hook extending from the outer wall and away from the inner wall, the first hook extending at least a portion of the length of the box like structure, a second edge of the box like structure having a second hook extending from the outer wall and away from the inner wall, the second hook extending at least a portion of the length of the box like structure, the first hook is arranged at a first distance from the outer wall, the second hook is arranged at a second distance from the outer wall and the second distance being greater than the first distance.

BRIEF DESCRIPTION OF THE DRAWINGS

The present disclosure will be more fully described by way of example with reference to the accompanying drawings, in which:—

FIG. 6 is a further enlarged perspective view of a cold side of portions of the edges of two adjacent combustion chamber segments shown in FIG. 3.

FIG. 7 is a cross-sectional view through portions of the edges of two adjacent combustion chamber segments shown in FIG. 6.

FIG. 8 is a further enlarged cross-sectional view through the portions of the edges of two adjacent combustion chamber segments shown in FIG. 7.

FIG. 9 is an enlarged part perspective and cross-sectional view of the combustion chamber shown in FIG. 2 showing a mounting of a combustion chamber segment to a combustion chamber upstream wall.

FIG. 12 is a perspective view of a cold side of portions of the edges of two adjacent alternative combustion chamber segments shown in FIG. 3.

FIG. 12A is a cross-section along line C-C in FIG. 12.

FIG. 12B is a cross-section along line D-D in FIG. 12A.

FIG. 12C is an alternative cross-section along line D-D in FIG. 12A.

FIG. 13 is a view of a hot side of portions of the edges of two adjacent alternative combustion chamber segments shown in FIG. 3.

FIG. 14 is a view of a hot side of portions of the edges of two adjacent alternative combustion chamber segments shown in FIG. 3.

FIG. 15 is a view of a hot side of portions of the edges of two adjacent alternative combustion chamber segments shown in FIG. 3.

FIG. 16 is a view of a hot side of portions of the edges of two adjacent alternative combustion chamber segments shown in FIG. 3.

FIG. 18 is an apparatus for manufacturing a combustion chamber segment according to the present disclosure.

DETAILED DESCRIPTION

Figure 1:
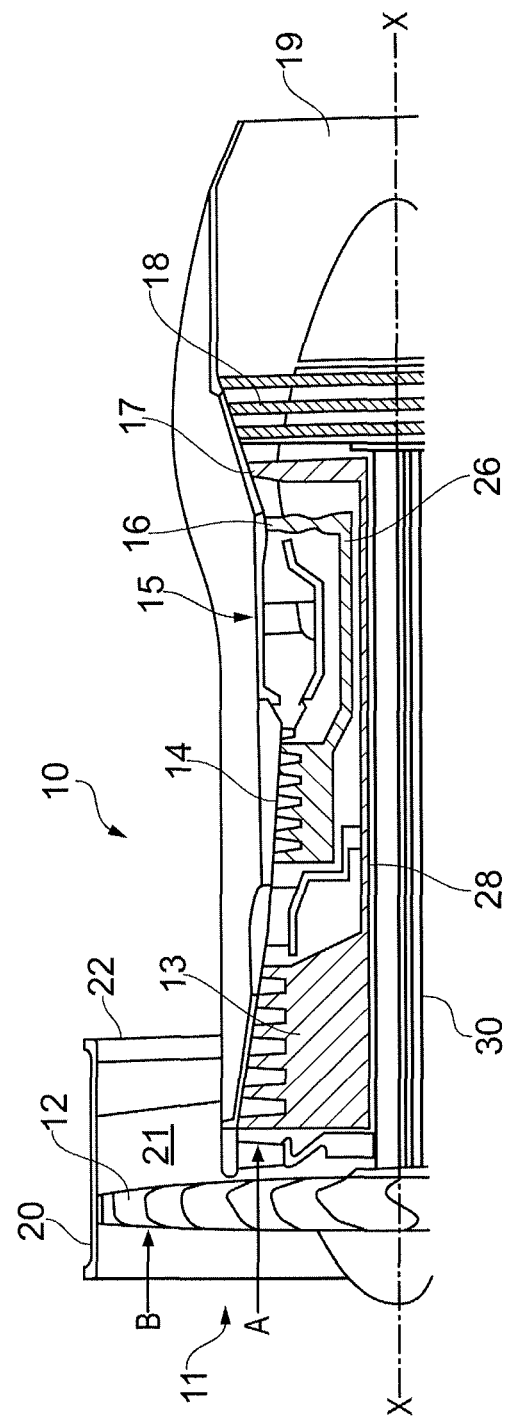
FIG. 1 is partially cut away view of a turbofan gas turbine engine having a combustion chamber comprising combustion chamber segments according to the present disclosure.

A turbofan gas turbine engine 10, as shown in FIG. 1, comprises in flow series an intake 11, a fan 12, an intermediate pressure compressor 13, a high pressure compressor 14, a combustion chamber 15, a high pressure turbine 16, an intermediate pressure turbine 17, a low pressure turbine 18 and an exhaust 19. The high pressure turbine 16 is arranged to drive the high pressure compressor 14 via a first shaft 26. The intermediate pressure turbine 17 is arranged to drive the intermediate pressure compressor 13 via a second shaft 28 and the low pressure turbine 18 is arranged to drive the fan 12 via a third shaft 30. The fan 12 is arranged within a fan casing 20 which defines a fan, or bypass, duct 21 and the fan duct 21 has a fan exhaust 22. In operation air flows into the intake 11 and is compressed by the fan 12. A first portion of the air A flows through, and is compressed by, the intermediate pressure compressor 13 and the high pressure compressor 14 and is supplied to the combustion chamber 15. Fuel is injected into the combustion chamber 15 and is burnt in the air to produce hot exhaust gases which flow through, and drive, the high pressure turbine 16, the intermediate pressure turbine 17 and the low pressure turbine 18. The hot exhaust gases leave the low pressure turbine 18 and flow through the exhaust 19 to provide propulsive thrust. A second portion of the air flow B bypasses the main engine and flows through the fan duct 21 and through the fan exhaust 22 to provide propulsive thrust.

Figure 2:
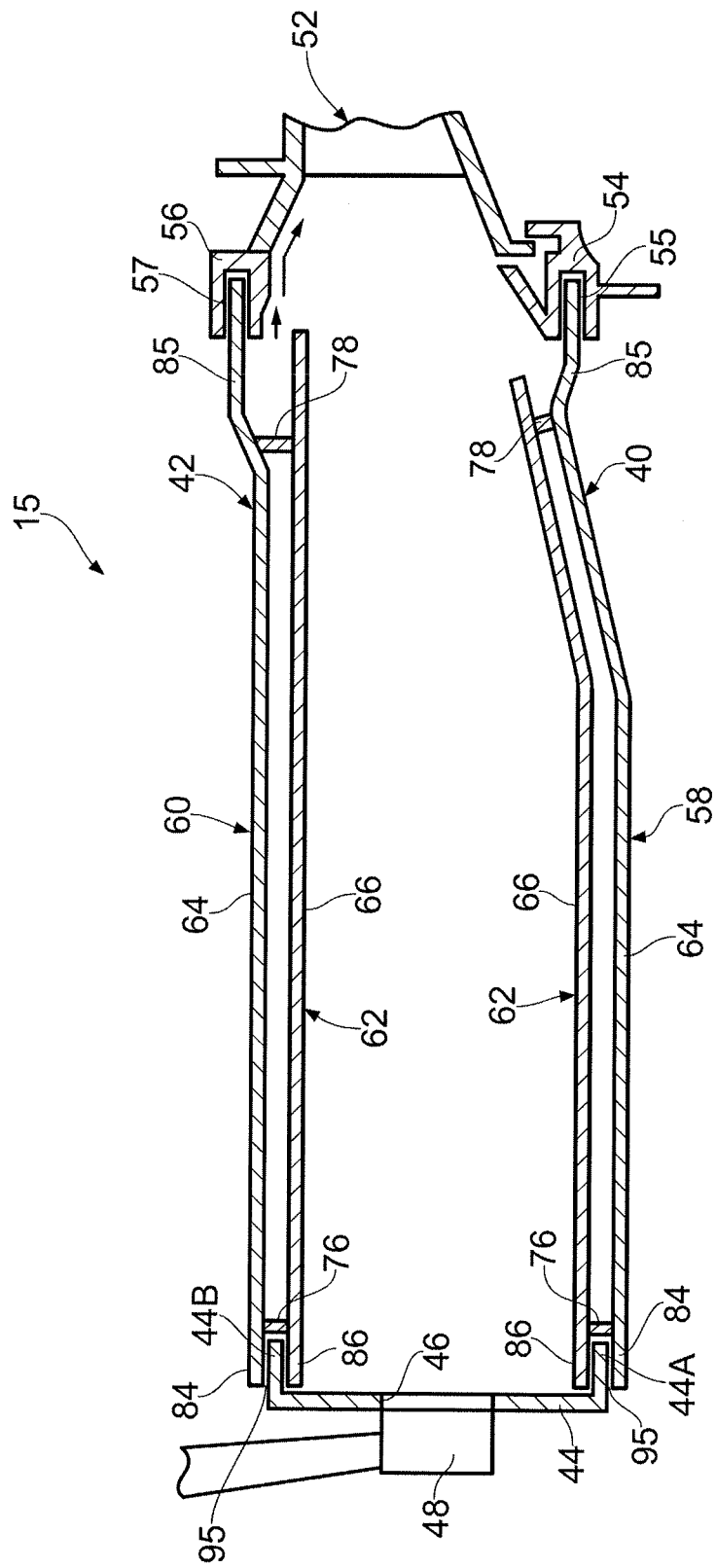
FIG. 2 is an enlarged cross-sectional view of a combustion chamber comprising combustion chamber segments according to the present disclosure.

The combustion chamber 15, as shown more clearly in FIG. 2, is an annular combustion chamber and comprises a radially inner annular wall structure 40, a radially outer annular wall structure 42 and an upstream end wall structure 44. The upstream end of the radially inner annular wall structure 40 is secured to the upstream end wall structure 44 and the upstream end of the radially outer annular wall structure 42 is secured to the upstream end wall structure 44. The upstream end wall structure 44 has a plurality of circumferentially spaced apertures 46 and each aperture 46 has a respective one of a plurality of fuel injectors 48 located therein. The fuel injectors 48 are arranged to supply fuel into the annular combustion chamber 15 during operation of the gas turbine engine 10. A plurality of circumferentially arranged turbine nozzle guide vanes 52 are positioned axially downstream of the combustion chamber 15 and arranged to direct the hot gases from the combustion chamber 15 into the high pressure turbine 16. The radially inner ends of the turbine nozzle guide vanes 52 are secured to a radially inner discharge nozzle 54 and the radially outer ends of the turbine nozzle guide vanes 52 are secured to a radially outer discharge nozzle 56.

The radially inner discharge nozzle 54 forms a radially inner downstream ring structure and the radially outer discharge nozzle 56 forms a radially outer downstream ring structure. The upstream end wall structure 44 has an inner annular flange 44A extending in an axially downstream direction therefrom and an outer annular flange 44B extending in an axially downstream direction therefrom. The upstream end wall structure 44 forms a radially inner upstream ring structure and a radially outer upstream ring structure. The radially inner annular wall structure 40 of the annular combustion chamber 15 and the radially outer annular wall structure 42 of the annular combustion chamber 15 comprise a plurality of circumferentially arranged combustion chamber segments 58 and 60 respectively. It is to be noted that the combustion chamber segments 58, 60 extend the full axial, longitudinal, length of the combustion chamber 15.

Figure 3:
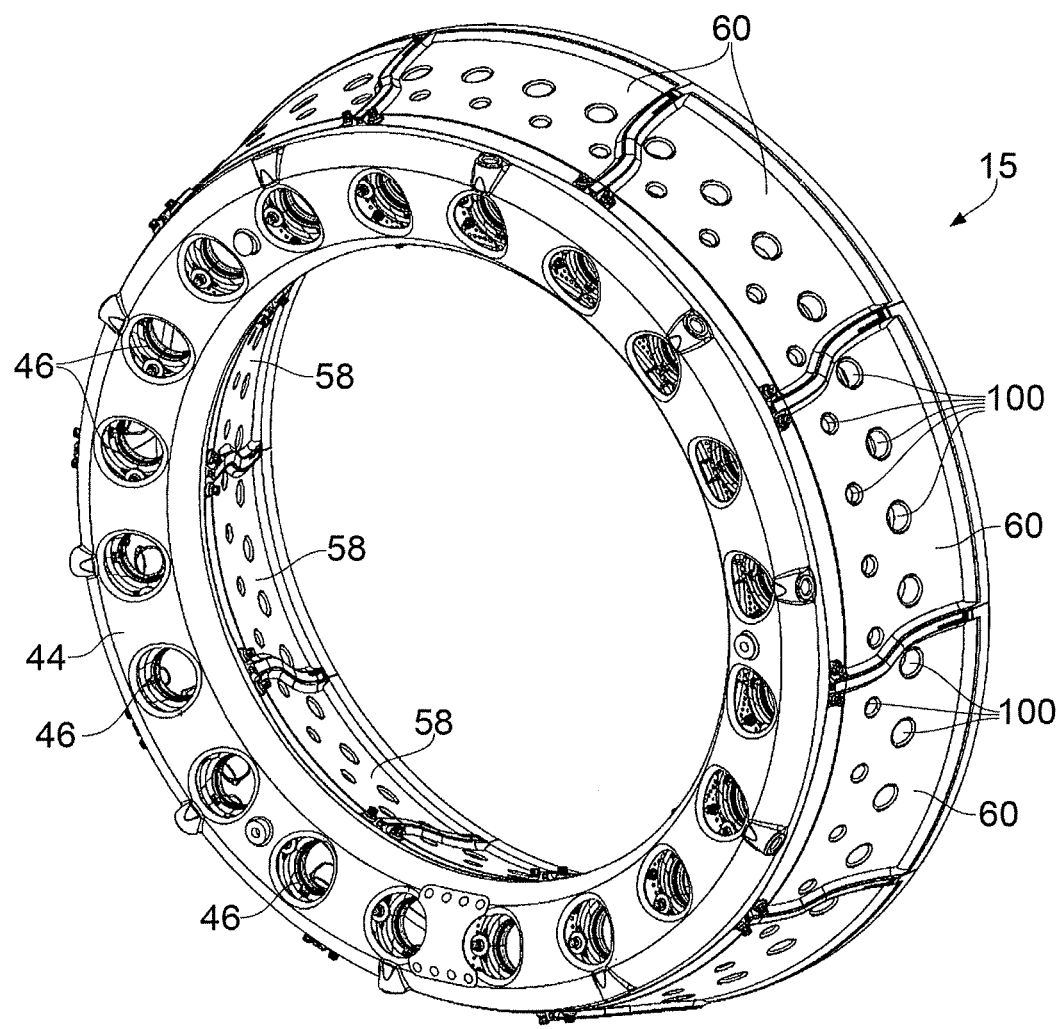
FIG. 3 is a perspective view of a combustion chamber comprising combustion chamber segments according to the present disclosure.
Figure 4:
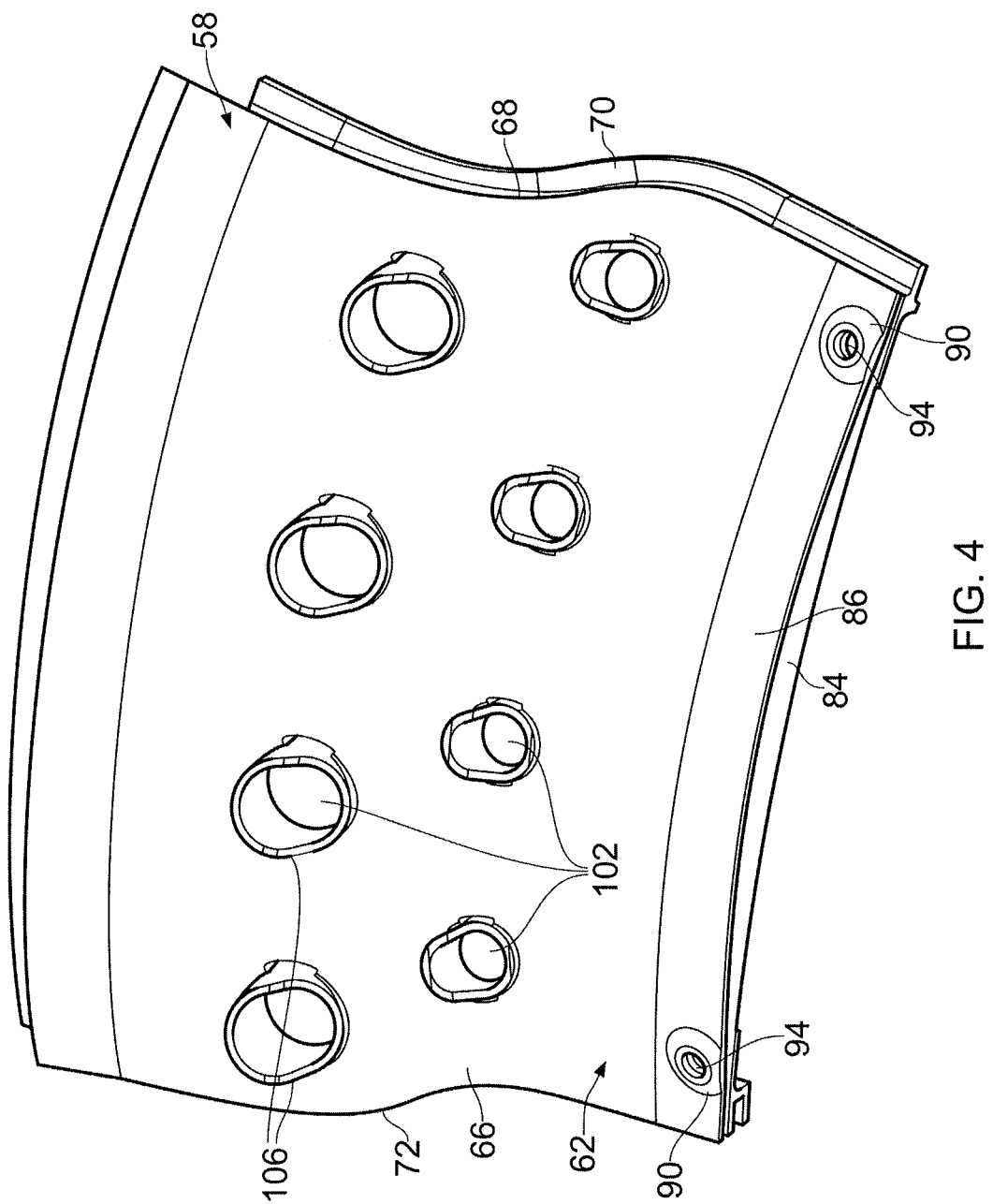
FIG. 4 is a further enlarged perspective view of a hot side of a combustion chamber segment shown in FIG. 3.
Figure 5:
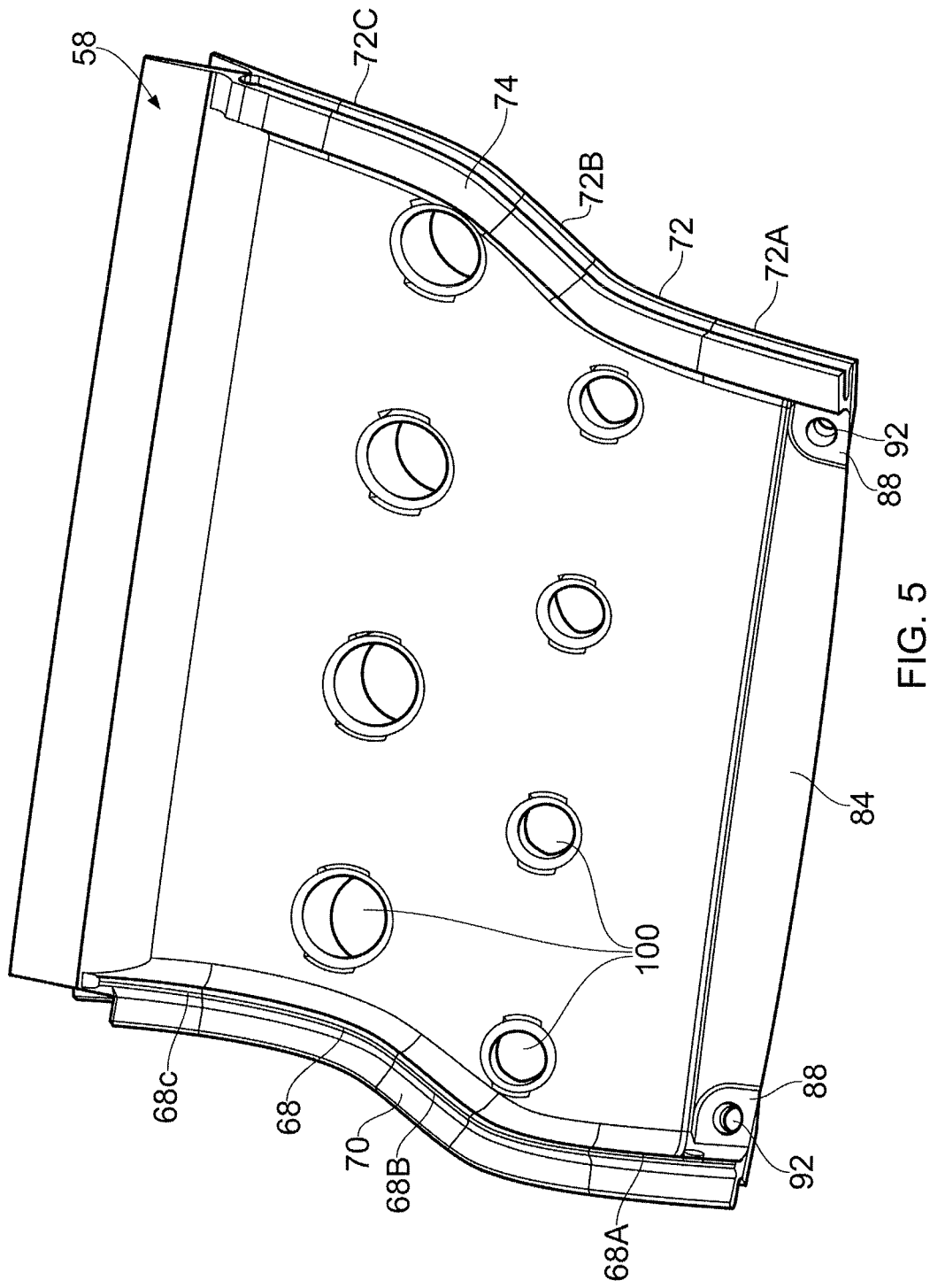
FIG. 5 is a further enlarged perspective view of a cold side of a combustion chamber segment shown in FIG. 3.

The circumferential arrangement of combustion chamber segments 58 and 60 of the radially inner and radially outer annular wall structures 40 and 42 of the annular combustion chamber 15 are clearly shown in FIG. 3. In this example there are ten combustion chamber segments 58 and ten combustion chamber segments 60 and each combustion chamber segment 58 and 60 extends through an angle of 36°. Other suitable numbers of combustion chamber segments 58 and 60 may be used, e.g. two, three, four, five, six, eight or twelve, and the number of combustion chamber segments 58 may be the same as or different to the number of combustion chamber segments 60. It is preferred that each of the combustion chamber segments extends through the same angle, but it may be possible to arrange the combustion chamber segments to extend through different angles.

Each combustion chamber segment 58 and 60, as shown in FIGS. 4 to 9, comprises a box like structure 62 including an outer wall 64 and an inner wall 66 spaced from the outer wall 64. The outer wall 64 and the inner wall 66 are arcuate. FIGS. 4 to 9 show a combustion chamber segment 58 of the radially inner annular wall structure 40. The outer wall 64 has a plurality of apertures 69 for the supply of coolant into the box like structure 62 and the inner wall 66 has a plurality of apertures 67 for the supply of coolant out of the box like structure 62. A first edge 68 of the box like structure 62 has a first hook 70 extending from the outer wall 64 and away from the inner wall 66. The first hook 70 extends at least a portion of the axial, longitudinal, length of the box like structure 62 and the first hook 70 is arranged at a first radial distance from the outer wall 64. A second edge 72 of the box like structure 62 has a second hook 74 extending from the outer wall 64 and away from the inner wall 66. The second hook 74 extends at least a portion of the axial, longitudinal, length of the box like structure 62, the second hook 74 is arranged at a second radial distance from the outer wall 64 and the second radial distance is greater than the first radial distance. The first hook 70 of each combustion chamber segment 58, 60 engages the outer wall 64 at the second edge 72 of an adjacent combustion chamber segment 58, 60 and the second hook 74 of each combustion chamber segment 58, 60 engages the first hook 70 of an adjacent combustion chamber segment 58, 60 to form a seal and to distribute loads between the adjacent combustion chamber segments 58, 60 and to maintain a circular profile, shape, for the radially inner, or radially outer, annular wall structure 40 and 42 of the annular combustion chamber 15, e.g. to prevent dislocation of the combustion chamber segments 58, 60. Thus, the first hook 70 of each combustion chamber segment 58, 60 contacts, abuts, or is in close proximity to the surface of the outer wall 64 at the second edge 72 of the adjacent combustion chamber segment 58, 60 and the second hook 74 of each combustion chamber segment 58, 60 contacts, abuts, or is in close proximity to the surface of the first hook 70 at the first edge 68 of the adjacent combustion chamber segment 58, 60. The first hook 70 of each combustion chamber segment 60 is arranged radially outwardly of the outer wall 64 at the second edge 72 of the adjacent combustion chamber segment 60 and the second hook 74 of each combustion chamber 60 is arranged radially outwardly of the first hook 70 at the first edge 68 of the adjacent combustion chamber segment 60. Similarly, the first hook 70 of each combustion chamber segment 58 is arranged radially inwardly of the outer wall 64 at the second edge 72 of the adjacent combustion chamber segment 58 and the second hook 74 of each combustion chamber segment 58 is arranged radially inwardly of the first hook 70 at the first edge 68 of the adjacent combustion chamber segment 58. The first hook 70 is integral with the first edge 68 of the box like structure 62 and the second hook 74 is integral with the second edge 72 of the box like structure 62.

The upstream end of each combustion chamber segment 58, 60 is secured to the upstream ring structure and the downstream end of each combustion chamber segment is mounted on the downstream ring structure. Thus, the upstream end of each combustion chamber segment 58 is secured to the upstream ring structure, e.g. the upstream end wall structure, 44 and the downstream end of each combustion chamber segment 58 is mounted on the radially inner downstream ring structure, e.g. the radially inner discharge nozzle, 54. Similarly, the upstream end of each combustion chamber segment 60 is secured to the upstream ring structure, e.g. the upstream end wall structure, 44 and the downstream end of each combustion chamber segment 60 is mounted on the radially outer downstream ring structure, e.g. the radially outer discharge nozzle, 56.

The first hook 70 extends the length of the box like structure 62 between a securing arrangement and a mounting arrangement and the second hook 74 also extends the length of the box like structure 62 between the securing arrangement and the mounting arrangement. The securing arrangement and the mounting arrangement are discussed further below.

However, it may be possible for the first hook to extend the full length of the box like structure and for the second hook to extend the full length of the box like structure. Alternatively, it may be possible for the first hook to extend only a part of the full length of the box like structure and for the second hook to extend only a part of the full length of the box like structure. Additionally, it may be possible for there to be a plurality of first hooks arranged along the length of the box like structure and for there to be a number of second hooks arranged along the length of the box like structure.

The box like structure 62 of each combustion chamber segment 58, 60 has a first end wall 76 extending from a first, upstream, end of the outer wall 64 to a first, upstream, end of the inner wall 66, a second end wall 78 extending from a second, downstream and opposite, end of the outer wall 64 to a second, downstream and opposite, end of the inner wall 66. A first edge wall 80 extending from a first circumferential edge of the outer wall 64 to a first circumferential edge of the inner wall 66, a second edge wall 82 extending from a second, opposite circumferential, edge of the outer wall 64 to a second, opposite circumferential, edge of the inner wall 66 to form the box like structure 62.

The first and second edges 68 and 72 of the combustion chamber segments 58, 60 are axially profiled so that the at least some of the apertures 67 in the inner wall 66 direct coolant over at least a portion of one of the edges 68 and 72 of the combustion chamber segment 58, 60, as shown in FIGS. 3 to 6. In this particular example first and second edges 68 and 72 of each combustion chamber segment 58, 60 has a first portion 68A, 72A extending with a purely axial component, a second portion 68B, 72B extending with axial and circumferential components and a third portion 68C, 72C extending with a purely axial component. Thus, the first and second edges 68 and 72 of each combustion chamber segment 58, 60 are profiled so that the at least some of the apertures 67A in the inner wall 66 near the first edge 68 direct coolant over at least a portion of the second edge 70 of an adjacent combustion chamber segment 58, 60.

In particular the apertures 67A in the inner wall 66 near the first edge 68 in the first and second portions 68A and 68B of each combustion chamber segment 58, 60 direct coolant in a generally axially downstream direction across the gap between the first edge 68 of the combustion chamber segment 58, 60 and the second edge 72 of the adjacent combustion chamber segment 58, 60 and then over the second and third portions 72B and 72C of the adjacent combustion chamber segment 58, 60, as shown in FIG. 13.

Alternatively, the first and second edges 68, 72 of the combustion chamber segments 58, 60 may extend with axial and circumferential components, as shown in FIG. 14, and in this example the first and second edges 68 and 72 of the combustion chamber segments 58, 60 may be arranged at an angle of up to 60° to upstream end of the combustion chamber segments 58, 60. In this example the apertures 67B in the inner wall 66 near the first edge 68 of each combustion chamber segment 58, 60 direct coolant in a generally axially downstream direction across the gap between the first edge 68 of the combustion chamber segment 58, 60 and the second edge 72 of the adjacent combustion chamber segment 58, 60 and then over the second edge 72 of the adjacent combustion chamber segment 58, 60.

As a further alternative the first and second edges 68, 70 of the combustion chamber segments 58, 60 may be S-shaped, as shown in FIG. 15, or W-shaped as shown in FIG. 16. In FIG. 15 the apertures 67C in the inner wall 66 near the first edge 68 in two portions 68D and 68F of the first edge 68 of each combustion chamber segment 58, 60 direct coolant in a generally axially downstream direction across the gap between the first edge 68 of the combustion chamber segment 58, 60 and the second edge 72 of the adjacent combustion chamber segment 58, 60 and then over portions 72D and 72F of the second edge 72 of the adjacent combustion chamber segment 58, 60 and also the apertures 67D in the inner wall 66 near the second edge 72 in one portion 72E of the second edge 72 of each combustion chamber segment 58, 60 direct coolant in a generally axially downstream direction across the gap between the second edge 72 of the combustion chamber segment 58, 60 and the first edge 68 of the adjacent combustion chamber segment 58, 60 and then over portion 68E of the first edge 68 of the adjacent combustion chamber segment 58, 60. In FIG. 16 the apertures 67E in the inner wall 66 near the first edge 68 in two portions 68H and 68J of the first edge 68 of each combustion chamber segment 58, 60 direct coolant in a generally axially downstream direction across the gap between the first edge 68 of the combustion chamber segment 58, 60 and the second edge 72 of the adjacent combustion chamber segment 58, 60 and then over portions 72H and 72J respectively of the second edge 72 of the adjacent combustion chamber segment 58, 60 and also the apertures 67F in the inner wall 66 near the second edge 72 in two portions 72G and 72I of the second edge 72 of each combustion chamber segment 58, 60 direct coolant in a generally axially downstream direction across the gap between the second edge 72 of the combustion chamber segment 58, 60 and the first edge 68 of the adjacent combustion chamber segment 58, 60 and then over portion 68G and 68I respectively of the first edge 68 of the adjacent combustion chamber segment 58, 60.

Thus, the first hooks 70 and second hooks 74 are spaced radially from the outer wall 64 and inner wall 66 to enable the cooling to be substantially seamless across the joint.

The box like structure 62 of each combustion chamber segment 58, 60 comprises a frame 75. The frame 75 comprises the first and second end walls 76 and 78 and the first and second edge walls 80 and 82. The first and second end walls 76 and 78 and the first and second edge walls 80 and 82 are integral, e.g. one piece. The frame 75 of each combustion chamber segment 58, 60 is radially thicker, and stiffer, than the outer wall 64 and the inner wall 66 and the first and second end walls 76 and 78 and the first and second edge walls 80 and 82 are thicker axially and thicker circumferentially respectively than the radial thickness of the outer and inner walls 64 and 66 in order to carry loads and interface with adjacent combustion chamber segments 58, 60 and the upstream ring structure and the downstream ring structure. The frame 75 of each combustion chamber segment 58, 60 is arranged to carry the structural loads, the thermal loads, surge loads and flameout loads. The first hook 70 is provided on the first edge wall 80 and the second hook 74 is provided on the second edge wall 82. In other words the box like structure 62 of each combustion chamber segment 58, 60 comprises the frame 75 and portions of the outer and inner walls 64 and 66 extending axially, longitudinally, between the first and second end walls 76 and 78 and extending circumferentially, laterally, between the first and second edge walls 80 and 82.

The first and second edge walls 80 and 82 of the combustion chamber segments 58, 60 are arranged at a non-perpendicular angle to the outer wall 64 and/or the inner wall 66, as shown in FIGS. 7 and 8. The first and second edge walls 80 and 82 in particular are arranged at an angle in the range of 70° to 90° to the outer wall 64 and/or the inner wall 66. More preferably the first and second edge walls 80 and 82 are arranged at an angle of 70° to 85° or more preferably 75° to 85° to the outer wall 64 and/or the inner wall 66. In this particular example the first and second edge walls 80 and 82 are arranged at an angle of 80° to the outer wall 64 and/or the inner wall 66, see in particular FIGS. 7 and 8.

The first, upstream, end of the outer wall 64 of each combustion chamber segment 58, 60 has a flange 84 and the flange 84 has at least one locally thicker region 88, each locally thicker region 88 of the outer wall 64 has an aperture 92 extending there-through. The first, upstream, end of the inner wall 66 has a flange 86 and the flange 86 has at least one locally thicker region 90, each locally thicker region 90 of the inner wall 66 has an aperture 94 extending there-through. The at least one locally thicker region 88 at the first end of the outer wall 64 is arranged such that the aperture 92 is aligned with the aperture 94 through the corresponding locally thicker region 90 of the inner wall 66 and an annular slot 95 is formed between the flange 84 of the first end of the inner wall 66 and the flange 86 of the first end of the outer wall 66. The flange 84 at the first end of the outer wall 64 and the flange 86 at the first end of the inner wall 66 of each combustion chamber segment 58, 60 have a plurality of locally thickened regions 88, 90 respectively and the locally thicker regions 88, 90 are spaced apart circumferentially, laterally, between the first and second edges 68, 70 of the outer and inner walls 64 and 66 of the combustion chamber segments 58, 60. The aperture 94 in the at least one, or each, locally thickened region 90 of the inner wall 66 of each combustion chamber segment 58, 60 is threaded.

Each combustion chamber segment 58, 60 is secured to the upstream end wall structure 44 by one or more bolts 96. Each combustion chamber segment 58 is positioned such that the inner annular flange 44A of the upstream end wall structure 44 is located radially between the flanges 84 and 86 at the upstream end of the combustion segment 58 and such that the apertures 92 and 94 in the flanges 84 and 86 are aligned with a corresponding one of a plurality of circumferentially spaced apertures 45A in the flange 44A of the upstream end wall structure 44. Bolts 96 are inserted through the aligned apertures 92 and 45A and threaded into the apertures 94 to secure the combustion chamber segment 58 to the upstream end wall structure 44. Similarly, each combustion chamber segment 60 is positioned such that the inner annular flange 44B of the upstream end wall structure 44 is located radially between the flanges 84 and 86 at the upstream end of the combustion segment 60 and such that the apertures 92 and 94 in the flanges 84 and 86 are aligned with a corresponding one of a plurality of circumferentially spaced apertures 45B in the flange 44B of the upstream end wall structure 44. Bolts 96 are inserted through the aligned apertures 92 and 45A and threaded into the apertures 94 to secure the combustion chamber segment 60 to the upstream end wall structure 44. Alternatively, rivets may be inserted through the aligned apertures 92 and 45A and the apertures 94 to secure the combustion chamber segment 60 to the upstream end wall structure 44.

The flange 84 at the first end of the outer wall 64 of each combustion chamber segment 58, 60 may have at least one axially, longitudinally, extending slot positioned circumferentially, laterally, between two circumferentially, laterally, spaced locally thickened regions 88 of the outer wall 64 of the combustion chamber segment 58, 60. The slots allow for flexing of the outer wall 64 to allow differential thermal expansion in the circumferential direction.

The second hook 74 of each combustion chamber segment 58, 60 forms a groove and the first hook 70 forms a tongue. The second hook 74 of each combustion chamber segment 58, 60 may form a dovetail shaped groove and the first hook 70 of each combustion chamber segment 58, 60 may form a dovetail shaped tongue.

Each combustion chamber segment 58 is mounted on the radially inner downstream ring structure, e.g. the radially inner discharge nozzle, 54. The second, downstream, end of the outer wall 64 of each combustion chamber segment 58 has a flange 85 and the flange 85 of each combustion chamber segment 58 is positioned in an annular slot 55 formed in the radially inner discharge nozzle 54, as shown in FIG. 2. Each combustion chamber segment 60 is mounted on the radially outer downstream ring structure, e.g. the radially outer discharge nozzle, 56. The second, downstream, end of the outer wall 64 of each combustion chamber segment 60 has a flange 85 and the flange 85 of each combustion chamber segment 60 is positioned in an annular slot 57 formed in the radially outer discharge nozzle 56, also shown in FIG. 2.

The outer wall 66 of each combustion chamber segment 58, 60 has at least one dilution aperture 100, the inner wall 66 of each combustion chamber segment 58, 60 has at least one dilution aperture 102 aligned with the corresponding dilution aperture 100 in the outer wall 64. At least one dilution wall 104 extends from the periphery of the corresponding dilution aperture 100 in the outer wall 64 to the periphery of the corresponding dilution aperture 102 in the inner wall 66. The inner wall 66 of each combustion chamber segment 58, 60 has at least one dilution chute 106, the at least one dilution chute 106 extends from the inner wall 66 in a radial direction away from the inner wall 66 and the outer wall 66 and each dilution chute 106 is aligned with a corresponding one of the dilution apertures 104 in the inner wall 66, as shown in FIGS. 4 to 7. In this example there are a plurality of dilution apertures 100, corresponding dilution apertures 102, dilution walls 104 and dilution chutes 106.

If the combustion chamber is a lean burn combustion chamber the combustion chamber segments 58, 60 are not provided with dilution apertures, dilution walls and dilution chutes.

Figure 10A:
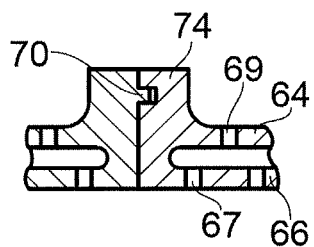
FIG. 10A is a cross-section along line A-A in FIG. 10.
Figure 10B:
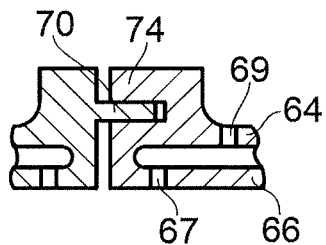
FIG. 10B is a cross-section along line B-B in FIG. 10.
Figure 10:
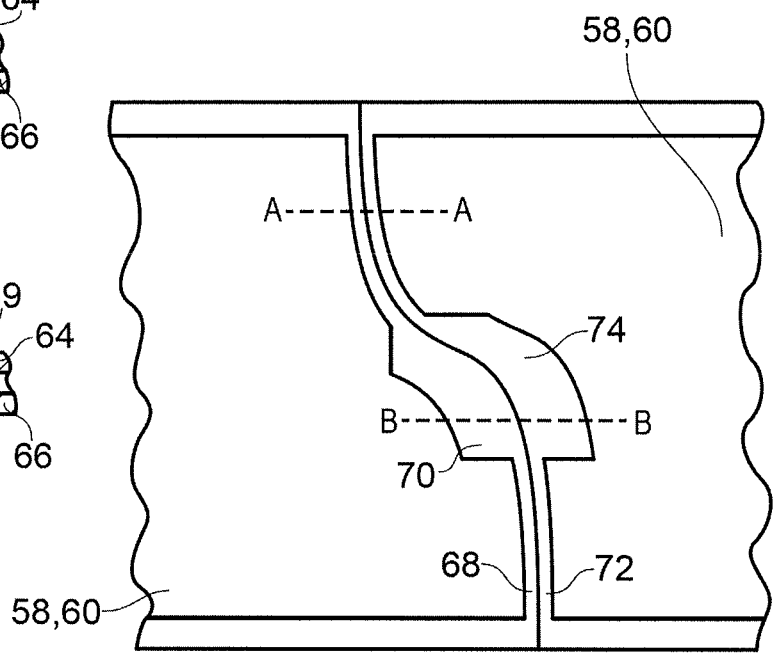
FIG. 10 is a view of a cold side of portions of the edges of two adjacent alternative combustion chamber segments shown in FIG. 3.

FIGS. 10, 10A and 10B show combustion chamber segments 58, 60 which have an alternative arrangement for the first hook 70 and the second hook 74 on the first and second edges 68 and 72 of the combustion chamber segments 58, 60. In this arrangement the first and second hooks 70 and 74 have different circumferential lengths at different axial positions along the combustion chamber segments 58, 60. In this example at the axially central regions, see FIG. 10B, of the first and second edges 68 and 72 the first and second hooks 70 and 74 are longer than at the axial end region, see FIG. 10A.

Figure 11:
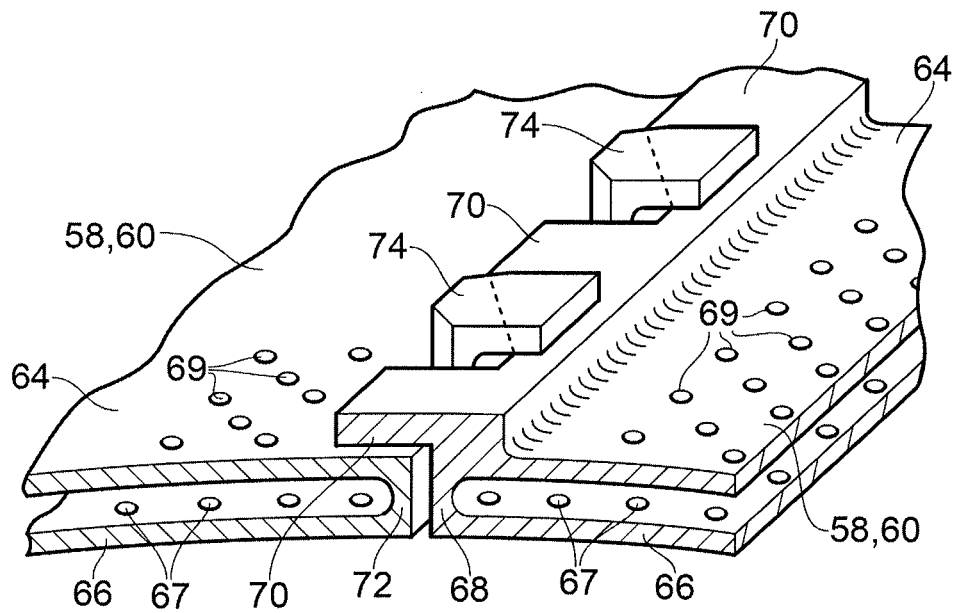
FIG. 11 is a perspective view of a cold side of portions of the edges of two adjacent alternative combustion chamber segments shown in FIG. 3.

FIG. 11 show combustion chamber segments 58, 60 which have another arrangement for the first hook 70 and the second hook 74 on the first and second edges 68 and 72 of the combustion chamber segments 58, 60. In this arrangement there are a plurality of first hooks 70 axially, longitudinally, spaced apart along the first edge 68 and a plurality of second hooks 74 axially, longitudinally, spaced apart along the second edge 72 combustion chamber segments 58, 60. In this example the first hooks 70 on the first edge 68 of each combustion chamber segment 58, 60 are arranged to axially, longitudinally, inter digitate with the second hooks 74 on the second edge 72 of an adjacent combustion chamber segment 58, 60. In other words the second hooks 74 on the second edge 72 locate in gaps between the first hooks 70 on the first edge 68 of the adjacent combustion chamber segment 58, 60. In addition the majority of the first hooks 70 have a generally trapezium shape in plan view such that the gaps between adjacent first hooks 70 are generally triangular in plan view, e.g. the gaps are greatest between the remote ends of the first hooks 70, and the second hooks 74 have generally triangular bases extending from the outer wall 64 such that each second hook 74 overlaps a portion of a respective one of the trapezium shaped hooks 70.

FIGS. 12, 12A and 12B show combustion chamber segments 58, 60 which have an alternative arrangement for the first hook 70 and the second hook 74 on the first and second edges 68 and 72 of the combustion chamber segments 58, 60. In this arrangement the first and second hooks 70 and 74 extend generally along the full axial, longitudinal, length of the first and second edges 68 and 72 and the second hook 74 has a plurality of apertures 73 extending radially there-through and the first hook 70 has a plurality of impingement apertures 71 extending radially there-through. In addition the outer wall 64 has a plurality of apertures 79 extending radially there-though interconnecting the space within the combustion chamber segment 58, 60 to the slot formed by the second hook 74 and the outer surface of the outer wall 64 within which the first hook 70 of adjacent combustion chamber segment 58, 60 locates. The apertures 73 in the second hook 74, the apertures 71 in the first hook 70 and the apertures 79 in the outer wall 64 allow a flow of coolant to cool the second edge 72 of the combustion chamber segment 58, 60 and also to cool the second and first hooks 74 and 72.

FIGS. 12, 12A and 12C show combustion chamber segments 58, 60 which have an alternative arrangement for the first hook 70 and the second hook 74 on the first and second edges 68 and 72 of the combustion chamber segments 58, 60. In this arrangement the first and second hooks 70 and 74 extend generally along the full axial, longitudinal, length of the first and second edges 68 and 72 and the second hook 74 has a plurality of apertures 65 extending radially there-through and the remote end of the first hook 70 a plurality of scallops 77 extending radially there-through. In addition the outer wall 64 has a plurality of apertures 79 extending radially there-though interconnecting the space within the combustion chamber segment 58, 60 to the slot formed by the second hook 74 and the outer surface of the outer wall 64 within which the first hook 70 of adjacent combustion chamber segment 58, 60 locates. The apertures 73 in the second hook 74, the scallops 77 at the remote end of the first hook 70 and the apertures 79 in the outer wall 64 allow a flow of coolant to cool the second edge 72 of the combustion chamber segment 58, 60 and also to cool the second and first hooks 74 and 72.

The apertures 69 in the outer wall 64 of each combustion chamber segment 58, 60 may be arranged perpendicularly to the surface of the outer wall 64. The apertures 67 in the inner wall 66 of each combustion chamber segment 58, 60 may be arranged perpendicularly to the surface of the inner wall 66 or at non-perpendicular angle to the surface of the inner wall 66.

The apertures 69 in the outer wall 64 of each combustion chamber segment 58, 60 may be arranged perpendicularly to the surface of the outer wall 64 and the apertures 67 in the inner wall 66 of each combustion chamber segment 58, 60 may be arranged perpendicularly to the surface of the inner wall 66 or at non-perpendicular angle to the surface of the inner wall 66 so that the apertures 69 in the outer wall provide impingement cooling of the inner wall 66 and the apertures 67 in the inner wall 66 provide effusion cooling of the inner wall 66. The apertures 67 in the inner wall 66 of each combustion chamber segment 58, 60 arranged at a non-perpendicular angle to the surface of the inner wall 66 may be angled in a longitudinal, axial, direction. The apertures 67 in the inner wall 66 of each combustion chamber segment 58, 60 may have a fan shaped outlet, see FIGS. 13 to 16. Other suitable shapes of apertures may be used.

The inner wall 66 of each combustion chamber segment 58, 60 may have a plurality of pedestals extending from the inner wall 66 towards the outer wall 64 to provide additional cooling of the inner wall 66. The pedestals extending from the inner wall 66 towards the outer wall 64 may extend all the way to the outer wall 64 such that the pedestals, the inner wall 66 and the outer wall 64 are integral, e.g. one piece. Each combustion chamber segment 58, 60 may have U shaped effusion cooling apertures extending through the inner wall 66. The U shaped effusion cooling apertures in the inner wall 66 of each combustion chamber segment 58, 60 may have a fan shaped outlet, see FIGS. 13 to 16. The inlets and outlets of the U shaped effusion cooling apertures may be arranged axially, longitudinally, downstream of a U shaped bend on the U shaped effusion cooling aperture.

Alternatively, each combustion chamber segment 58, 60 may have a cellular structure between the inner wall 66 and the outer wall 66, the cellular structure comprising a plurality of polyhedron shaped chambers defined by a matrix of integral interconnected walls, the polyhedron shaped chambers are arranged in at least two layers between the inner wall 66 and the outer wall 64. At least some of the polyhedron shaped chambers in each layer are fluidly interconnected to at least some of the polyhedron shaped chambers in each adjacent layer by apertures extending through the integral interconnected walls of the polyhedron shaped chambers for the flow of coolant there-between. The apertures in the outer wall 64 allow a flow of coolant into the cellular structure and the apertures in the inner wall 66 allow a flow of coolant out of the cellular structure.

The polyhedron shaped chambers may be parallelogram sided cuboid shaped chambers, square based pyramid shaped chambers, rhombic dodecahedron shaped chambers, elongated dodecahedron shaped chambers, truncated dodecahedron shaped chambers or two types of irregular polyhedron shaped chambers arranged in a Weaire-Phelan structure.

The thickness of the wall of the polyhedron shaped chamber may be in the range of 0.2 to 2 mm.

The distance between the walls of the polyhedron shaped chambers may be in the range of 1 to 4 mm.

The combustion chamber segments 58, 60 may be formed from a nickel base superalloy, a cobalt base superalloy or an iron base superalloy. The nickel base superalloy may be C263 or CM247LC.

A thermal barrier coating may be provided on the surface of the inner wall 66 of the combustion chamber segments 58, 60.

The thermal barrier coating may comprise a ceramic material, for example the ceramic material may comprise zirconia or stabilised zirconia. The thermal barrier coating may be provided on the surface of the inner wall of the combustion chamber segments by plasma spraying, physical vapour deposition, e.g. electron beam physical vapour deposition, or chemical vapour deposition. A bond coating may be provided on the surface of the inner wall of the combustion chamber segments before the thermal barrier coating. The bond coating may comprise a MCrAlY coating, where M is one or more of nickel, cobalt and iron, or an aluminide coating, e.g. a simple aluminide, a chromium aluminide, a platinum aluminide, platinum chromium aluminide or a silicide aluminide.

Figure 17:
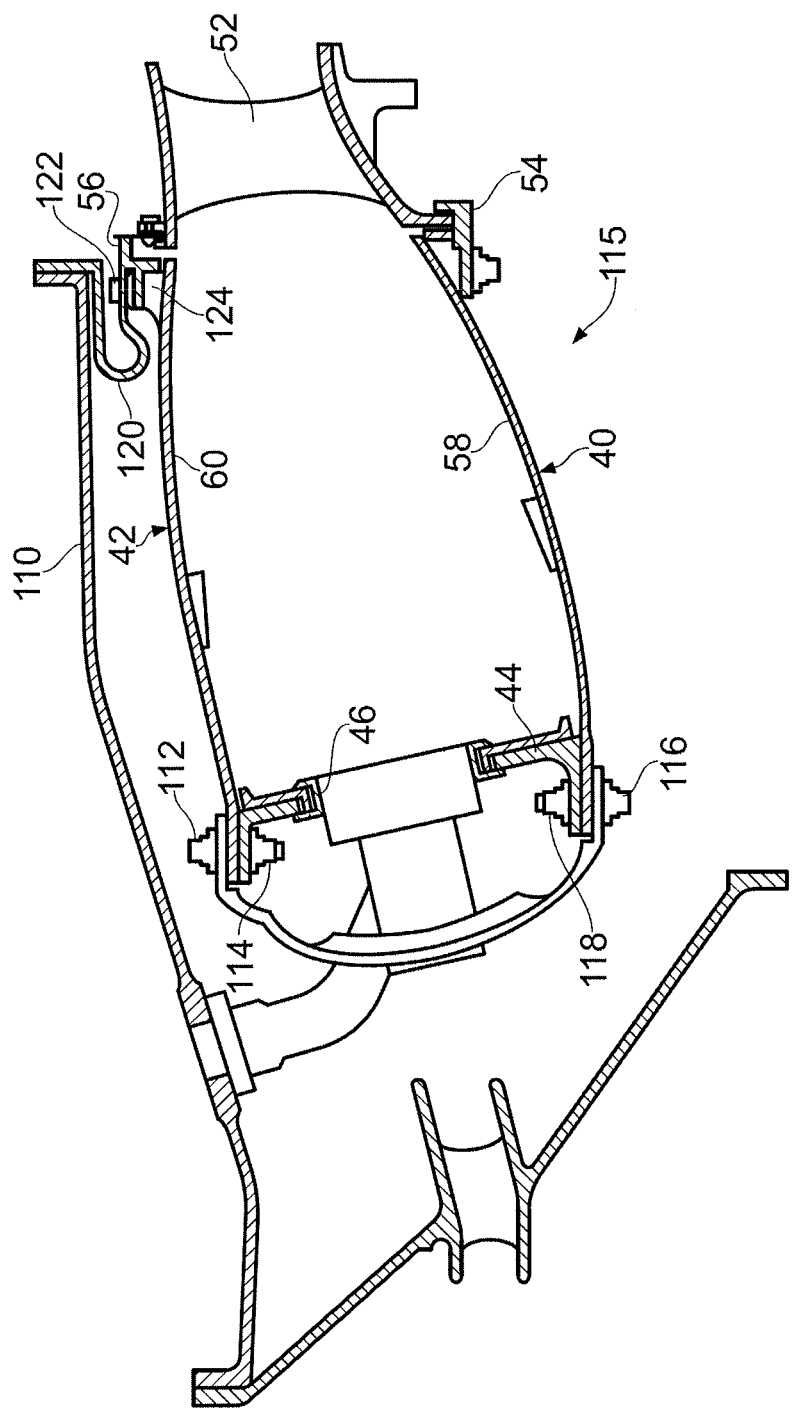
FIG. 17 is an enlarged cross-sectional view of another combustion chamber comprising combustion chamber segments according to the present disclosure.

FIG. 17 shows an alternative combustion chamber 115 which comprises a radially inner annular wall structure 40, a radially outer annular wall structure 42 and an upstream end wall structure 44. The upstream end of the radially inner annular wall structure 40 is secured to the upstream end wall structure 44 and the upstream end of the radially outer annular wall structure 42 is secured to the upstream end wall structure 44. The upstream end wall structure 44 has a plurality of circumferentially spaced apertures 46 and each aperture 46 has a respective one of a plurality of fuel injectors 48 located therein. The fuel injectors 48 are arranged to supply fuel into the annular combustion chamber 15 during operation of the gas turbine engine 10. A plurality of circumferentially arranged turbine nozzle guide vanes 52 are positioned axially downstream of the combustion chamber 15 and arranged to direct the hot gases from the combustion chamber 15 into the high pressure turbine 16. The radially inner ends of the turbine nozzle guide vanes 52 are secured to a radially inner discharge nozzle 54 and the radially outer ends of the turbine nozzle guide vanes 52 are secured to a radially outer discharge nozzle 56.

In this arrangement the radially inner annular wall structure 40 comprises a plurality of combustion chamber segments 58 and the radially outer annular wall structure 42 comprises a plurality of combustion chamber segments 60. The combustion chamber segments 60 are removably secured to the upstream end wall structure 44 by fasteners, e.g. nuts and bolts, 114, 112 and are removably secured to a U, or V, shaped ring 120 by fasteners, e.g. nuts and bolts, 124, 122. Each combustion chamber segment 60 has a single flange with apertures at its upstream end and has a radial flange with apertures at its downstream for attaching to the upstream end wall structure 44 and ring 120 respectively. The combustion chamber segments 58 are removably secured to the upstream end wall structure 44 by fasteners, e.g. nuts and bolts, 118, 116 and are removably secured to the radially inner discharge nozzle 54 by fasteners, e.g. nuts and bolts, 128, 126. Each combustion chamber segment 58 has a single flange with apertures at its upstream end and has an axial flange with apertures at its downstream for attaching to the upstream end wall structure 44 and discharge nozzle 54 respectively. The U, or V, shaped ring 120 is secured to the combustion chamber casing 110 and the U, or V, shaped ring 120 is resilient and flexible. Alternatively, the fasteners may be rivets.

In other alternatives the flange, or flanges, at the upstream ends of the combustion chamber segments 58, 60 may be welded, brazed or bonded to the upstream end wall structure 44 and the flange, or flanges, at the downstream ends of the combustion chamber segments 60 may be welded, brazed or bonded to the radially outer discharge nozzle or the U, or V, shaped ring and the combustion chamber segments 58 may be welded, brazed or bonded to the radially inner discharge nozzle. Alternatively the flange, or flanges, at the upstream ends of the combustion chamber segments 58, 60 may be removably secured to the upstream end wall structure and the flange, or flanges, at the downstream ends of the combustion chamber segments 60 may be welded, brazed or bonded to the radially outer discharge nozzle or the U, or V, shaped ring and the flange, or flanges, at the downstream ends of the combustion chamber segments 58 may be welded, brazed or bonded to the radially inner discharge nozzle. Alternatively, the flange, or flanges, at the upstream ends of the combustion chamber segments 58, 60 may be welded, brazed or bonded to the upstream end wall structure 44 and the flange, or flanges, at the downstream ends of the combustion chamber segments 60 may be removably secured to the radially outer discharge nozzle or the U, or V, shaped ring by fasteners and the flange, or flanges, at the downstream ends of the combustion chamber segments 58 may be removably secured to the radially inner discharge nozzle by fasteners. As a further possibility the fasteners at one end of the combustion chamber segments 58, 60 may be replaced with a bayonet type feature to mate with a corresponding feature on the upstream end wall structure 44 or the radially inner discharge nozzle, the radially outer discharge nozzle or the U, or V, shaped ring.

Each combustion chamber segment comprises an integral structure, e.g. a single piece or monolithic piece, formed by additive layer manufacturing. The apertures in the outer wall, the apertures in the inner wall and any structure or structures, e.g. cellular structure or pedestals, between the inner and outer wall are all formed by the additive layer manufacturing (ALM) process. The first and second hooks of each combustion chamber segment are also formed integrally with combustion chamber segment by the additive layer manufacturing (ALM) process. The additive layer manufacturing process may be direct laser deposition (DLD), selective laser sintering, direct electron beam deposition, laser powder bed etc. The combustion chamber segments are built using the additive layer manufacturing by initially starting from the upstream end, or the downstream end, of the combustion chamber segment. The combustion chamber segment is built up layer by layer using additive layer manufacturing in the longitudinal, axial, direction of the wall which corresponds to the direction of flow of hot gases over the second surface of the wall.

FIG. 18 shows an apparatus an apparatus 200 for manufacturing a combustion chamber segment 58, 60 according to the present disclosure. The apparatus 200 comprises a sealed chamber 202, which has a retractable platform 204. A pump 206 is provided to supply an inert gas, argon or nitrogen, through a pipe 208 into the chamber 202 and gas is extracted from the chamber 202 via a pipe 210. A laser 212, e.g. an infrared laser, is provided to direct a laser beam 219 through a window 214 in the chamber 202. A controller 220 has a CAD definition of the shape and features of the combustion chamber segment 58 or the combustion chamber segment 60 of the combustion chamber 15 and the laser 212 is moved under the control of the controller 220. In this case the controller 220 has a CAD definition of the shape and features of the combustion chamber segment 58 or the combustion chamber segment 60 of the combustion chamber 15 and the laser 212 is moved under the control of the controller 220.

The combustion chamber segment 58 or the combustion chamber segment 60 is manufactured by placing a first layer 216 of a suitable metal, or alloy, powder, on the retractable platform 204 in the sealed chamber 202. The laser beam 219 is scanned across the layer of metal powder 216 in a predetermined pattern to form a first layer of the combustion chamber segment 58 or the combustion chamber segment 60 by bodily moving the laser 212 appropriate distances in perpendicular X and Y directions or by deflecting the laser beam 219 off a movable mirror 218. The laser beam 219 melts and fuses or sinters the metal powder where it strikes the layer of metal powder 216. Then a second, thin, layer of metal, or alloy, is placed on the first layer, the platform 204 is retracted one increment outwards from the chamber 202 and the laser beam 219 is scanned across the layer of metal powder in a further predetermined pattern to form a second layer of the combustion chamber segment 58 or the combustion chamber segment 60 respectively. The laser beam 219 melts and fuses or sinters the metal powder where it strikes the second layer of metal powder 216 and bonds, fuses or sinters the second layer of the combustion chamber segment 58 or the combustion chamber segment 60 to the first layer of the combustion chamber segment 58 or the combustion chamber segment 60 respectively. The process of placing layers of metal powder, retracting the platform 204 and scanning the laser beam 219 across the layer of metal powder in a predetermined pattern to fuse and sinter the metal powder in each layer and to bond each layer to the previously deposited layer is repeated a sufficient number of times to build the combustion chamber segment 58 or the combustion chamber segment 60 layer by layer from one axial end to the opposite axial end. The predetermined pattern of scanning of the laser beam 219 for each layer is determined by the CAD model of the combustion chamber segment 58 or the combustion chamber segment 60.

The advantages of the present disclosure are that the combustion chamber segments have a stiff frame structure and the frame structure carries the structural loads, the thermal loads, surge loads and flameout loads. The frame structure distributes loads into adjacent components. The combustion chamber segments have first and second hooks which provide a leakage resistant joint between adjacent combustion chamber segments. The first and second hooks of the combustion chamber segments distribute the loads between the combustion chamber segments and reduce, or prevent, the possibility of the combustion chamber being distorted to a polygonal shape. The combustion chamber segments are mounted on ring structures which provide stiff hoop structure. The combustion chamber segments are amenable to different types of cooling arrangement. The combustion chamber segments are mechanically fixed to the ring structures enabling easy assembly, disassembly and replacement of combustion chamber segments. The combustion chamber segments are easily manufactured in a laser powder bed having base dimensions of 250 mm by 250 mm or 400 mm by 400 mm. The first and second hooks of the combustion chamber segments and thus the associated joints/seals have high surface finish/tolerances due to the axial/longitudinal build direction. It is believed that a combustion chamber comprising combustion chamber segments has a much lower unit cost than, a lower life cycle cost, a lower weight and better cooling effectiveness than combustion chambers comprising an outer wall and cast tiles.

Although the present disclosure has referred to a combustion chamber segment comprising a box structure in which the box structure comprises a frame it may be equally possible for a combustion chamber segment to simply comprise a frame and a portion of the inner wall extending axially, longitudinally, between the first and second end walls and extending circumferentially, laterally, between the first and second edge walls. It may be possible to manufacture this combustion chamber segment by casting and by drilling, e.g. laser drilling, any apertures through the inner wall.

Although the present disclosure has referred to combustion chamber segments in which a first hook of each combustion chamber segment overlaps an adjacent combustion chamber segment and a second hook of each combustion chamber segment overlaps the first hook of an adjacent combustion chamber segment to form a seal between adjacent combustion chamber segments it may be possible to arrange the first hook and the second hook at the same radial distance so that the first hook and the first edge define a first axially extending groove and the second hook and the second edge define a second axially extending groove and to provide a flat strip seal or an omega cross-section seals in the first groove of each combustion chamber segment and the second groove of an adjacent combustion chamber segment. It may also be possible to provide a lap joint between adjacent combustion chamber segments.

Although the present disclosure has been described with reference to an annular combustion chamber it is equally applicable to a tubular combustion chamber.

The inner wall of each combustion chamber segment defines a portion of the radially outer, or radially inner, boundary of the annular combustion chamber or the inner wall of each combustion chamber segment defines a portion of the radially outer boundary of the tubular combustion chamber.

It is to be noted that in each embodiment the combustion chamber segments extend the full axial, longitudinal, length of the combustion chamber. It is also to be noted that in each embodiment of a combustion chamber segment with a box like structure the inner and outer walls extend the full axial, longitudinal, length of the combustion chamber from the upstream end wall to the downstream end wall. It is further to be noted that in each embodiment of a combustion chamber segment with just the frame structure the inner wall extends the full axial, longitudinal, length of the combustion chamber from the upstream end wall to the downstream end wall.

The gas turbine engine may be an aero gas turbine engine, an industrial gas turbine engine, a marine gas turbine engine or an automotive gas turbine engine. The aero gas turbine engine may be a turbofan gas turbine engine, a turbo-shaft gas turbine engine, a turbo-propeller gas turbine engine or a turbojet gas turbine engine.

While the present disclosure has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The present disclosure in its broader aspects is therefore not limited to the specific details, representative apparatus and method, and illustrative example shown and described. Accordingly, departures may be made from such details without departing from the spirit or scope of applicant's general inventive concept.

The invention claimed is:

1. A combustion chamber comprising an upstream ring structure, a downstream ring structure and a plurality of circumferentially arranged combustion chamber segments,
   each combustion chamber segment extending a full length of the combustion chamber, each combustion chamber segment having an upstream end and a downstream end, the upstream end of each combustion chamber segment being secured to the upstream ring structure and the downstream end of each combustion chamber segment being mounted on the downstream ring structure,
   each combustion chamber segment comprising a frame structure and an inner wall, and the frame structure and the inner wall of each combustion chamber segment being an integral, monolithic structure, wherein:
   the frame structure having a first edge and a second edge opposite the first edge,
   the first edge of the frame structure having an integral first hook extending in a first direction from the inner wall, and the first hook is arranged at a first radial distance from the inner wall,
   the second edge of the frame structure having an integral second hook extending in a second direction from the inner wall that is an opposite direction of the first direction from the inner wall, and the second hook is arranged at a second radial distance from the inner wall with the second radial distance being greater than the first radial distance, and
   the first hook of each combustion chamber segment engaging the frame structure of an adjacent combustion chamber segment at the second edge of the adjacent combustion chamber segment and the second hook of each combustion chamber segment engaging the first hook of another adjacent combustion chamber segment to form a seal and to distribute loads between the adjacent combustion chamber segments, and
   the first hook extends a full length of the frame structure and the second hook extends the full length of the frame structure.

2. The combustion chamber as claimed in claim 1 wherein each combustion chamber segment comprising a box like structure, the box like structure comprising the frame structure, the inner wall and an outer wall, the inner wall being spaced from the outer wall, the outer wall having a plurality of apertures for the supply of coolant into the box like structure and the frame structure, the inner wall and the outer wall being integral.

3. The combustion chamber as claimed in claim 2 wherein the inner wall having a plurality of apertures for the supply of coolant out of the box like structure into the combustion chamber.

4. The combustion chamber as claimed in claim 3 wherein the apertures in the inner wall being arranged perpendicularly to the surface of the inner wall.

5. The combustion chamber as claimed in claim 3 wherein the apertures in the inner wall being arranged at a non-perpendicular angle to the surface of the inner wall and being angled in an axial direction.

6. The combustion chamber as claimed in claim 3 wherein the apertures in the inner wall having fan shaped outlets.

7. The combustion chamber as claimed in claim 2 wherein the apertures in the outer wall being arranged perpendicularly to the surface of the outer wall.

8. The combustion chamber as claimed in claim 2 wherein the inner wall having a plurality of pedestals extending towards the outer wall to provide additional cooling of the inner wall.

9. The combustion chamber as claimed in claim 3 wherein each combustion chamber segment having the first edge and the second edge opposite the first edge, the first edge and the second edge of each combustion chamber segment being axially profiled so that at least some of the plurality of apertures in the inner wall direct coolant over at least a portion of one of the first edge and the second edge of the combustion chamber segments.

10. The combustion chamber as claimed in claim 9 wherein the first edge and the second edge of each combustion chamber segment having a first portion extending with a purely axial component, a second portion extending with axial and circumferential components and a third portion extending with a purely axial component.

11. The combustion chamber as claimed in claim 9 wherein the first edge and the second edge of each combustion chamber segment extend with axial and circumferential components.

12. The combustion chamber as claimed in claim 9 wherein the first edge and the second edge of each combustion chamber segment having an S-shape or a W-shape.

13. The combustion chamber as claimed in claim 1, wherein the first edge and the second edge of each combustion chamber segment being profiled so that at least some of the plurality of apertures in the inner wall adjacent the first edge are arranged to direct coolant over at least a portion of the second edge of an adjacent combustion chamber segment and at least some of the apertures in the inner wall adjacent the second edge are arranged to direct coolant over at least a portion of the first edge of another adjacent combustion chamber segment.

14. The combustion chamber as claimed in claim 9 wherein the first edge and the second edge of each combustion chamber segment being profiled so that at least some of the plurality of apertures in the inner wall adjacent the first edge are arranged to direct coolant over at least a portion of the second edge of an adjacent combustion chamber segment.

15. The combustion chamber as claimed in claim 1 wherein the first hook forming a tongue and the second hook forming a groove.

16. The combustion chamber as claimed in claim 15 wherein the second hook having at least one second aperture extending there-through to the groove, and
the first hook having at least one first aperture extending there-through or a remote end of the first hook having at least one scallop and at least one first aperture extending from the groove through the outer wall.

17. The combustion chamber as claimed in claim 1 wherein the frame structure of each combustion chamber segment having a first end wall extending from a first end of the inner wall, a second end wall extending from a second end of the inner wall that is opposite the first end, a first edge wall, a second edge wall; and the first end wall, the first edge wall, the second end wall and the second edge wall being integral to form the frame structure.

18. The combustion chamber as claimed in claim 1 wherein the combustion chamber segments being formed from a material selected from the group consisting of a nickel base superalloy, a cobalt base superalloy or an iron base superalloy.

19. The combustion chamber as claimed in claim 1 wherein a thermal barrier coating being provided on the inner wall of the combustion chamber segments.

20. The combustion chamber as claimed in claim 1 wherein the combustion chamber segments are formed by additive layer manufacturing.

21. The combustion chamber as claimed in claim 1 wherein the upstream ring structure being an upstream end wall of the combustion chamber and the downstream ring structure being a discharge nozzle.

22. The combustion chamber as claimed in claim 21 wherein the upstream end of each combustion chamber segment being secured to the upstream end wall of the combustion chamber by a securement selected from the group consisting of a fastener, a weld and a bond; and the downstream end of each combustion chamber segment being mounted on the discharge nozzle by a mounting selected from the group consisting fastener, a weld and a bond.

23. The combustion chamber as claimed in claim 1 wherein the inner wall is a single inner wall of a single combustion chamber segment, the inner wall extending the full length between the upstream ring structure and the downstream ring structure.

24. The combustion chamber as claimed in claim 1 wherein the second hook and the second edge of the frame of each combustion chamber segment forming a groove, the first hook of each combustion chamber segment locating in the groove defined by the second hook and the second edge of the frame of the adjacent combustion chamber segment.

25. A combustion chamber comprising an upstream ring structure, a downstream ring structure and a plurality of circumferentially arranged combustion chamber segments,
each combustion chamber segment extending a full length of the combustion chamber, each combustion chamber segment having an upstream end and a downstream end, the upstream end of each combustion chamber segment being secured to the upstream ring structure and the downstream end of each combustion chamber segment being mounted on the downstream ring structure,
each combustion chamber segment comprising a box like structure, the box like structure comprising a frame structure, an inner wall and an outer wall, the inner wall being spaced from the outer wall, the outer wall having a plurality of apertures for the supply of coolant into the box like structure,
the frame structure having a first edge extending lengthwise of the combustion chamber segment and a second edge extending lengthwise of the combustion chamber segment,
the first edge of the frame structure having a first hook extending in a first direction from the inner wall, the first hook being arranged at a first radial distance from the inner wall,
the second edge of the frame structure having a second hook extending in a second direction from the inner wall that is an opposite direction of the first direction from the inner wall, the second hook being arranged at a second radial distance from the inner wall and the second radial distance is greater than the first radial distance,
the first hook of each combustion chamber segment engaging the frame structure of an adjacent combustion chamber segment at the second edge of the adjacent combustion chamber segment and the second hook of each combustion chamber segment engaging the first hook of another adjacent combustion chamber segment to form a seal and to distribute loads between the adjacent combustion chamber segments,
the frame structure, the inner wall, the outer wall, the first hook and the second hook of each combustion chamber segment being an integral, monolithic structure, and
the first hook extends a full length of the frame structure and the second hook extends the full length of the frame structure.

26. A combustion chamber segment, the combustion chamber segment extending a full length of a combustion chamber, the combustion chamber segment having an upstream end and a downstream end,
the upstream end of the combustion chamber segment having features to secure the combustion chamber segment to an upstream ring structure and the downstream end of the combustion chamber segment having features to mount the combustion chamber segment on a downstream ring structure, the combustion chamber segment comprising a frame structure and an inner wall, and the frame structure and the inner wall being an integral, monolithic structure, wherein:

the frame structure having a first edge and a second edge opposite the first edge, the first edge of the frame structure having an integral first hook extending in a first direction from the inner wall, and the first hook is arranged at a first radial distance from the inner wall, the second edge of the frame structure having an integral second hook extending is a second direction from the inner wall that is an opposite direction of the first direction from the inner wall, and the second hook is arranged at a second radial distance from the inner wall and the second radial distance is greater than the first radial distance, and the first hook extends a full length of the frame structure and the second hook extends the full length of the frame structure.

27. The combustion chamber segment as claimed in claim 26 wherein the combustion chamber segment comprising a box structure, the box structure comprising the frame structure, the inner wall and an outer wall, the inner wall being spaced from the outer wall, the outer wall having a plurality of apertures for the supply of coolant into the box structure; and the frame structure, the inner wall and the outer wall being integral.

28. The combustion chamber segment as claimed in claim 27 wherein the inner wall having a plurality of apertures for the supply of coolant out of the box structure, the first edge and the second edge of the combustion chamber segment being axially profiled so that the at least some of the apertures in the inner wall direct coolant over at least a portion of one of the edges of the combustion chamber segment.

29. The combustion chamber segment as claimed in claim 28 wherein the first edge and the second edge of the combustion chamber segment having a first portion extending with a purely axial component, a second portion extending with axial and circumferential components and a third portion extending with a purely axial component.

30. The combustion chamber segment as claimed in claim 26, wherein the first hook forms a tongue and the second hook forms a groove.

31. The combustion chamber segment as claimed in claim 30 wherein the second hook having at least one second aperture extending there-through to the groove, and the first hook having at least one first aperture extending there-through or a remote end of the first hook having at least one scallop and at least one first aperture extending from the groove through the outer wall.

32. The combustion chamber as claimed in claim 26 wherein the inner wall is a single inner wall of a single combustion chamber segment, the inner wall extending the full length between the upstream ring structure and the downstream ring structure.

33. The combustion chamber as claimed in claim 26 wherein the second hook and the second edge of the frame of each combustion chamber segment forming a groove, the first hook of each combustion chamber segment locating in the groove defined by the second hook and the second edge of the frame of the adjacent combustion chamber segment.

34. A combustion chamber segment, the combustion chamber segment extending a full length of a combustion chamber, the combustion chamber segment having an upstream end and a downstream end, the upstream end of the combustion chamber segment having features to secure the combustion chamber segment to an upstream ring structure and the downstream end of the combustion chamber segment having features to mount the combustion chamber segment on a downstream ring structure, the combustion chamber segment comprising a box like structure, the box like structure comprising a frame structure, an inner wall and an outer wall, the inner wall being spaced from the outer wall, the outer wall having a plurality of apertures for the supply of coolant into the box like structure, the frame structure having a first edge extending lengthwise of the combustion chamber segment and a second edge extending lengthwise of the combustion chamber segment, the first edge of the frame structure having a first hook extending in a first direction from the inner wall, the first hook being arranged at a first distance from the inner wall, the second edge of the frame structure having a second hook extending in a second direction from the inner wall that is an opposite direction of the first direction from the inner wall, the second hook being arranged at a second distance from the inner wall and the second distance is greater than the first distance, and the frame structure, the inner wall, the outer wall, the first hook and the second hook being an integral, monolithic structure, and the first hook extends a full length of the frame structure and the second hook extends the full length of the frame structure.

* * * * *